(12) United States Patent
Berent et al.

(10) Patent No.: US 8,220,399 B2
(45) Date of Patent: *Jul. 17, 2012

(54) FLAT PACK FRICTION FIT FURNITURE SYSTEM

(75) Inventors: Roger Jason Berent, Shelby Township, MI (US); Kyle David Hulewat, Rochester Hills, MI (US)

(73) Assignee: Edison Nation, LLC, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/298,499

(22) Filed: Nov. 17, 2011

(65) Prior Publication Data

US 2012/0056463 A1    Mar. 8, 2012

Related U.S. Application Data

(63) Continuation of application No. 12/208,849, filed on Sep. 11, 2008, now Pat. No. 8,079,315.

(60) Provisional application No. 61/034,290, filed on Mar. 6, 2008, provisional application No. 60/971,651, filed on Sep. 12, 2007.

(51) Int. Cl.
*A47B 13/00* (2006.01)

(52) U.S. Cl. ............... 108/158.12; 108/180; 108/157.14

(58) Field of Classification Search ............ 108/157.14, 108/158.12, 157.18, 180, 165, 166, 184, 108/153.1, 154, 157.1, 157.15, 157.16; 312/195; 297/440.12, 440.13

See application file for complete search history.

(56) References Cited

U.S. PATENT DOCUMENTS

| 401,798 | A | | 4/1889 | Spencer |
| 861,454 | A | | 7/1907 | Garrison |
| 1,645,336 | A | | 10/1927 | McGlothern |
| 1,776,071 | A | * | 9/1930 | Horwath .................. 108/157.16 |
| 1,854,663 | A | | 4/1932 | Nebel |

(Continued)

FOREIGN PATENT DOCUMENTS

DE    611 017 C    3/1935

(Continued)

OTHER PUBLICATIONS

International Search Report dated Jan. 20, 2009 PCT/US2008/075999.

(Continued)

*Primary Examiner* — Jose V Chen
(74) *Attorney, Agent, or Firm* — Tillman Wright, PLLC; James D. Wright; Chad D. Tillman

(57) ABSTRACT

An article of furniture and associated methods and kits comprising at least one first leg support structure, at least one second leg support structure, the at least one first leg support structure being inter-fitted with the at least one second first leg support structure via an interference fit to define a support assembly, a top that is supported by and attached to the support assembly without the need for a mechanical fastener or adhesive; and means for creating a force state that attaches the top to the support assembly without the need for a mechanical fastener or adhesive, and thereby stabilizes the article of furniture, wherein the force state includes one or more forces applied to the at least one first leg support structure and the at least one second leg support structure, in addition to any frictional force from the interference fit.

19 Claims, 19 Drawing Sheets

U.S. PATENT DOCUMENTS

| | | | | |
|---|---|---|---|---|
| 1,940,117 A * | 12/1933 | Carpos | | 108/157.18 |
| 2,010,342 A * | 8/1935 | Woods | | 108/157.18 |
| 2,026,995 A * | 1/1936 | Myers | | 108/126 |
| D150,886 S | 9/1948 | Ross | | |
| 2,481,671 A * | 9/1949 | John et al. | | 108/101 |
| D166,660 S | 5/1952 | Curtis | | |
| 2,632,498 A | 3/1953 | Curtis | | |
| 2,842,416 A * | 7/1958 | Davock | | 108/158.12 |
| 3,300,245 A * | 1/1967 | Rumble | | 297/158.5 |
| 3,338,189 A | 8/1967 | Xavier | | |
| 3,620,175 A * | 11/1971 | Crane et al. | | 108/157.14 |
| 3,758,152 A | 9/1973 | Lake | | |
| 3,807,823 A * | 4/1974 | Rouse | | 312/195 |
| 4,084,517 A | 4/1978 | Guess | | |
| 4,632,040 A * | 12/1986 | Sheffer | | 108/157.14 |
| 4,740,032 A * | 4/1988 | Olsen et al. | | 297/139 |
| 4,765,253 A | 8/1988 | Schappach | | |
| 4,832,421 A | 5/1989 | Shoffner | | |
| 4,834,450 A * | 5/1989 | Stickler | | 297/139 |
| 4,881,779 A | 11/1989 | Bubien | | |
| D322,364 S | 12/1991 | Smith | | |
| 5,367,964 A * | 11/1994 | Hockensmith | | 108/180 |
| D359,397 S | 6/1995 | McPhee | | |
| D361,441 S | 8/1995 | Goldstein | | |
| 5,551,748 A | 9/1996 | McKelvey et al. | | |
| 5,644,995 A * | 7/1997 | Gurwell et al. | | 108/188 |
| 6,206,473 B1 | 3/2001 | Kondratiev | | |
| 6,443,076 B1 * | 9/2002 | Case, Jr. | | 108/157.18 |
| D468,561 S | 1/2003 | De Blaay | | |
| 6,532,878 B2 * | 3/2003 | Tidemann | | 108/186 |
| 6,615,746 B2 | 9/2003 | Bart | | |
| 6,619,601 B1 * | 9/2003 | Vall | | 248/188 |
| 6,619,749 B2 | 9/2003 | Willy | | |
| 6,807,912 B2 | 10/2004 | Willy | | |
| 6,814,010 B2 * | 11/2004 | Bart | | 108/158.12 |
| D513,898 S | 1/2006 | Frey | | |
| D514,340 S | 2/2006 | Frey | | |
| 7,219,962 B2 | 5/2007 | Stone | | |
| D548,494 S | 8/2007 | Mercs | | |
| 7,300,110 B1 | 11/2007 | Debien | | |
| 7,516,708 B2 * | 4/2009 | Willy et al. | | 108/157.14 |
| 8,079,315 B2 * | 12/2011 | Berent et al. | | 108/158.12 |
| 2002/0069797 A1 | 6/2002 | Cawe, Jr. | | |
| 2003/0205180 A1 * | 11/2003 | Bishop | | 108/158.12 |
| 2004/0055515 A1 * | 3/2004 | Chen | | 108/157.14 |

FOREIGN PATENT DOCUMENTS

| | | |
|---|---|---|
| GB | 480 626 A | 2/1938 |
| NL | 1 008 556 C1 | 9/1999 |
| WO | 89/03748 A | 5/1989 |
| WO | 00/03147 A | 1/2000 |

OTHER PUBLICATIONS

Cragelmeyer, Design Democracy, available at http://www.designdemocracy08.com/node/160, last accessed Mar. 11, 2008.
Copending, U.S. Appl. No. 29/324,399, filed Sep. 11, 2008.
Copending, U.S. Appl. No. 29/324,401, filed Sep. 11, 2008.

* cited by examiner

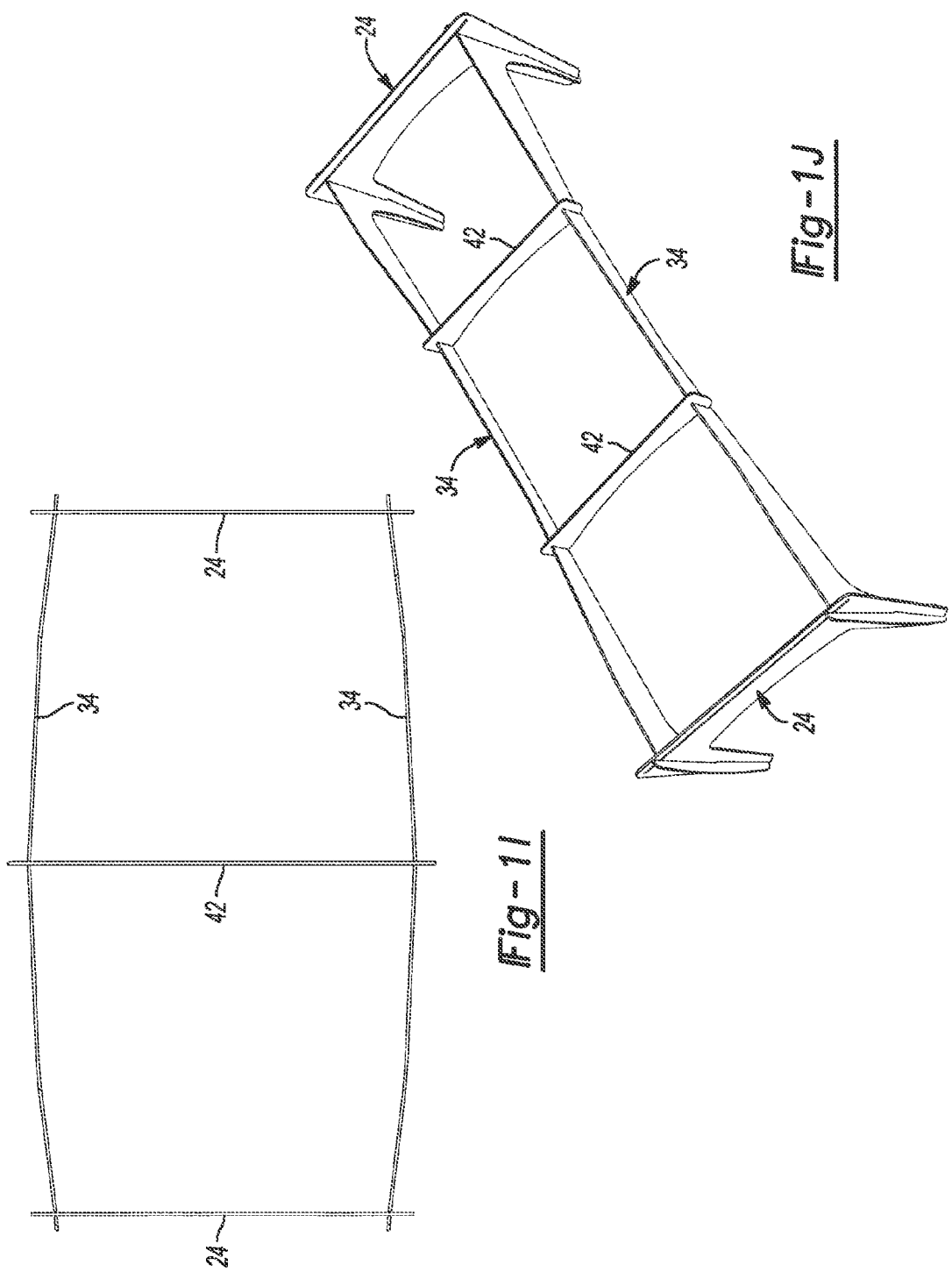

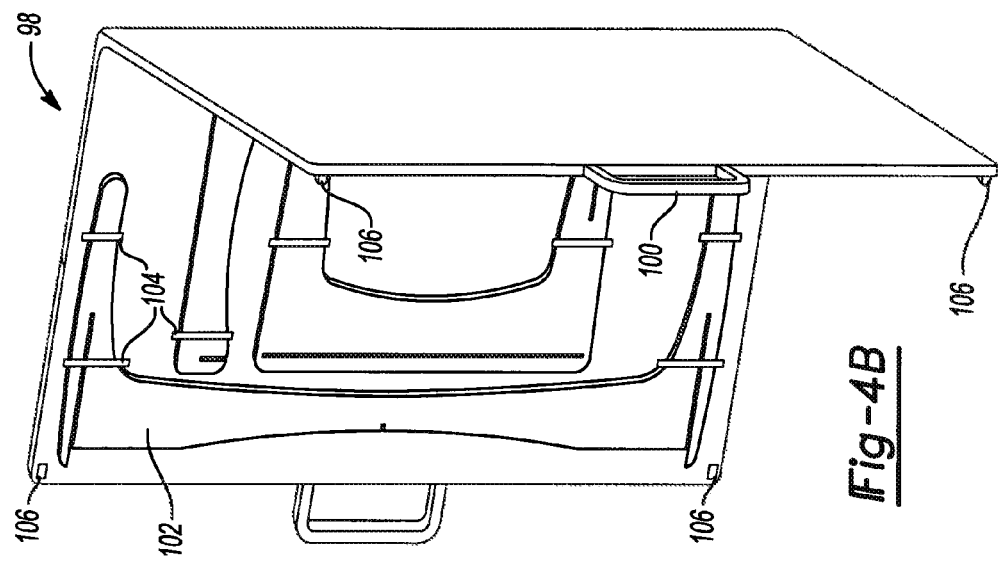
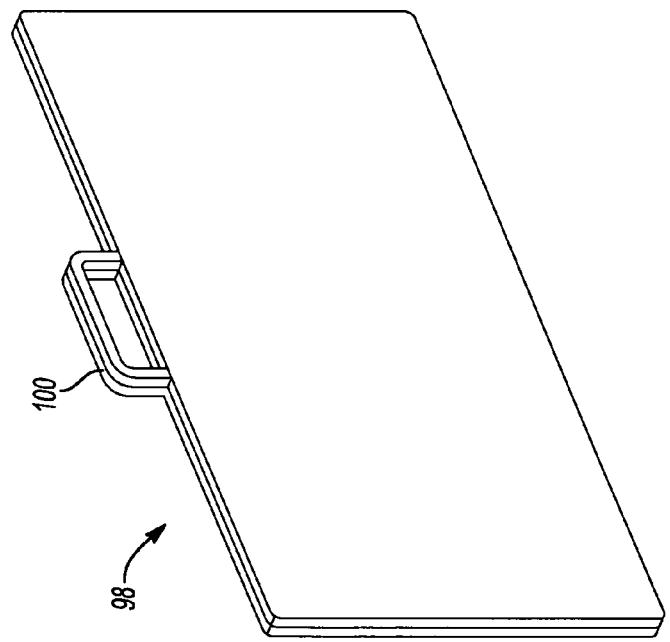
Fig-4B
Fig-4A

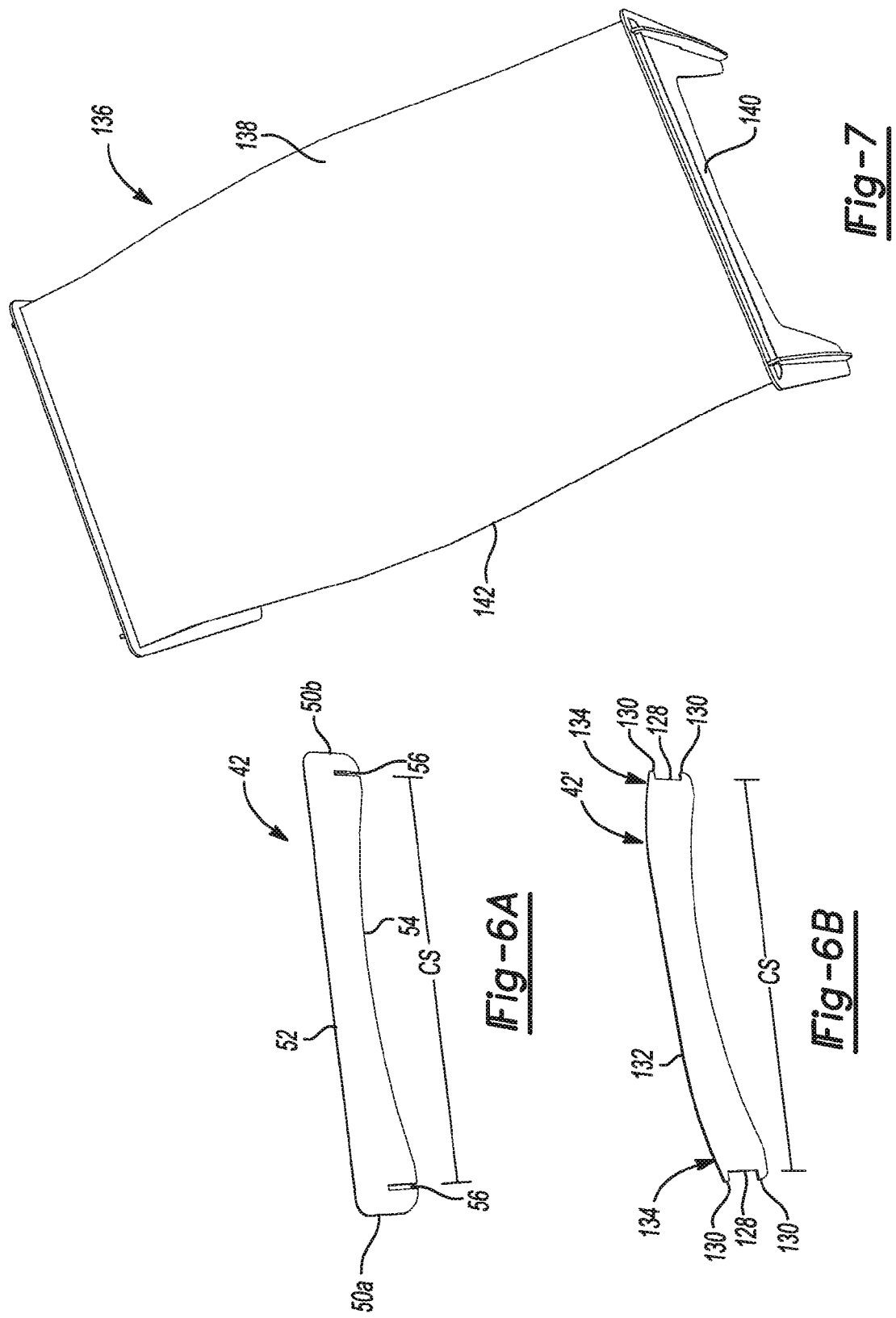

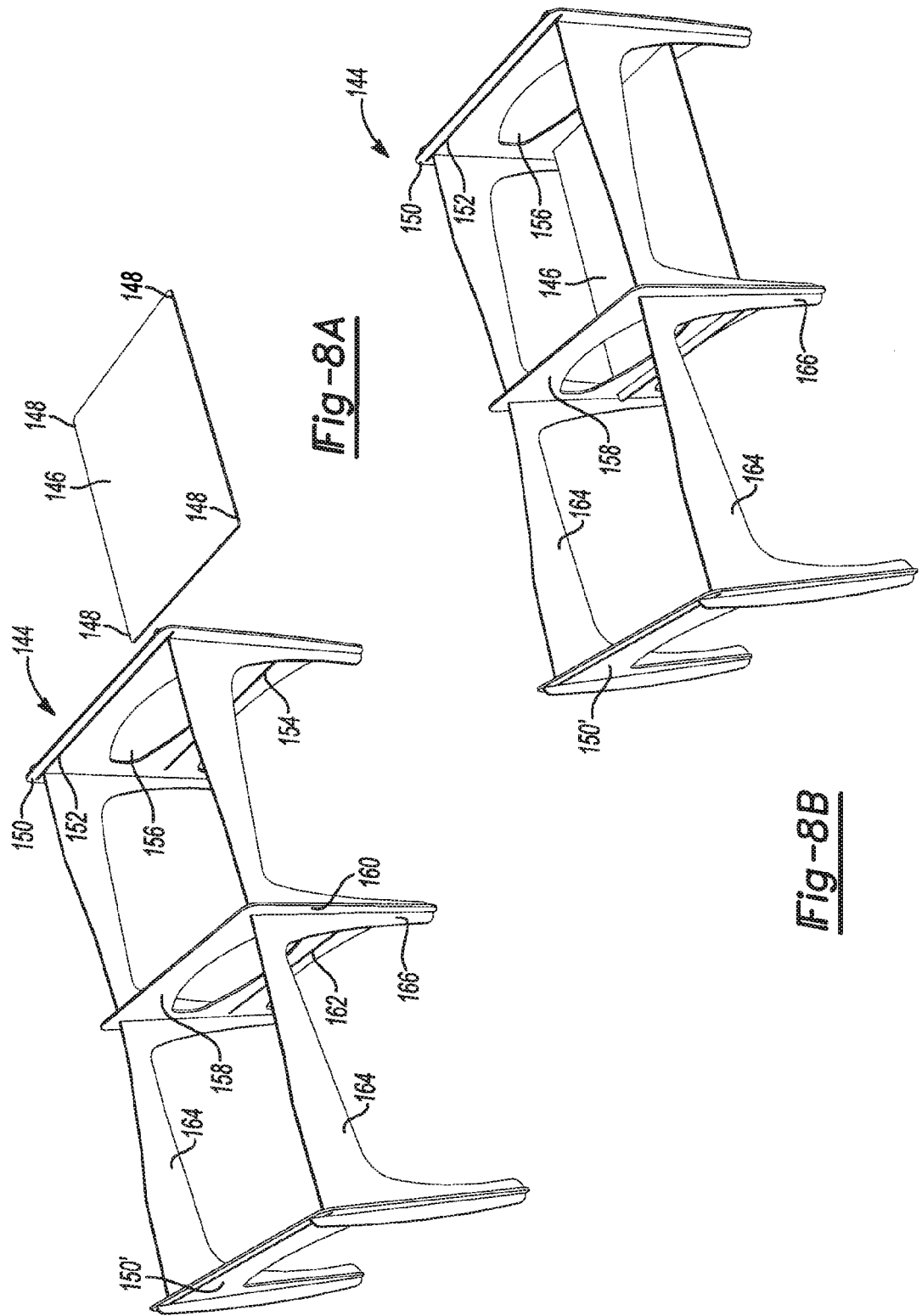

FLAT PACK FRICTION FIT FURNITURE SYSTEM

CLAIM OF PRIORITY

This application is a continuation of Ser. No. 12/208,849, filed on Sep. 11, 2008 now U.S. Pat. No. 8,079,315, which claims the benefit of U.S. Provisional Application Ser. No. 61/034,290 filed Mar. 6, 2008 and U.S. Provisional Application Ser. No. 60/971,651 filed Sep. 12, 2007 all of which are incorporated herein by reference for all purposes.

FIELD OF THE INVENTION

The present invention is directed generally to articles of furniture and the method of forming such articles from a blank of sheet material, and more particularly, to such articles of furniture constructed from panels engaged to form an inter-fitted construction.

BACKGROUND OF THE INVENTION

Inter-fitted furniture has been popular for many years. Past designs have required complicated assembly operations. To reduce part count, relatively thick part sections (with attendant heavy part weights) commonly have been employed. Additionally, to achieve a stable structure (e.g., a structure that resists wobbling when loaded), fasteners or complicated geometric structures have been necessary. Further, because of one or more of the foregoing, assembled structures were prone to remaining assembled and often lack ready transportability.

Despite the above efforts there has remained a need in the art for improved inter-fitted furniture that meets one or more of the following needs: it is relatively easy to assemble, it is relatively easy to transport, it packages in a relatively flat and low-profile structure, it is relatively stable (e.g., it resists wobbling when loaded), it can be manufactured in large quantities but yet allow for customization (e.g., its structure lends itself to mass-customization), it is relatively lightweight, it is relatively easy to disassemble, it requires no hand tools to assemble, or it can be manufactured by a system that limits material usage and/or waste.

Examples of efforts to provide various articles of furniture include those disclosed in Published U.S. Patent Application Nos. 20020069797; 20030205180; and U.S. Pat. Nos. 401, 798; 1,940,117; 2,481,671; 3,338,189; 3,758,152; 4,084,517; 4,740,032; 4,765,253; 4,832,421; 5,367,964; 5,644,995; 6,206,473; 6,619,749; 6,807,912; and 7,219,962, all incorporated by reference.

SUMMARY OF THE INVENTION

The present invention meets some or all of the above-mentioned needs by providing an improved inter-fitted furniture structure that is premised upon a system that employs a top, and spaced apart slotted leg support structures that inter-fit with each other (e.g., by frictional inter-connection of the slotted leg supports via the slots) and the top for supporting the top. The inter-fitted furniture structure includes structural features (e.g., structural features associated or used with the top, the slotted leg supports, or both) that create a force state (i.e., a state of overall measurable forces that are either tensile or compressive, and thus are other than a zero value state) that exceeds the force obtained from frictional engagement alone, for stabilizing the furniture structure.

In one aspect the invention contemplates an article of furniture comprising at least one first leg support structure; at least one second leg support structure; the at least one first leg support structure being inter-fitted with the at least one second first leg support structure via an interference fit to define a support assembly; a top that is supported by and attached to the support assembly without the need for a mechanical fastener or adhesive; and means for creating a force state that attaches the top to the support assembly without the need for a mechanical fastener or adhesive, and thereby stabilizes the article of furniture, wherein the force state includes one or more forces applied to the at least one first leg support structure and the at least one second leg support structure, in addition to any frictional force from the interference fit.

This aspect of the invention may be further characterized by one or any combination of the following features: at least one first leg support structure includes a first pair of opposing and spaced apart slotted leg supports, and the at least one second leg support structure includes a second pair of opposing and spaced apart slotted leg supports (optionally with each leg support including spaced leg portions that extends substantially entirely to a floor); the means for creating a force state includes at least one cross support that connects opposing spaced apart slotted leg supports of the first or second pair with each other in a tensile state or a compressive state of sufficient magnitude that the supports are elastically deflected; the means for creating a force state includes a nose portion on each of at least pair of slotted leg supports that laterally deflects and by its intrinsic elasticity applies a lateral force against an edge of the top; the top includes one or more notches along its side edges that engage at least one of the first or second leg support structures; the means for creating a force state includes at least one cross support that has a upper edge that bears against a bottom surface of the top to bow the upper surface of the top convexly outward; the means for creating a force includes a structure that surrounds inter-fitted leg portions of the opposing and spaced apart first and second pair of slotted leg supports; the article of furniture consists of an assembly of 7 individual parts or fewer; in its final assembled state, the article of furniture includes at least one edge lip in at least one leg support structure has a height that is greater than about 10 mm that is above the top; the largest thickness of any of its parts is less than about 12 mm; the top includes a plurality of openings in its interior; parts of the article of furniture are made from a faced composite material that includes a densified thermoplastic polymeric core sandwiched between layers of metal, and the faced composite material has a thickness of less than about 10 mm; the top member and the plurality of leg members are formed from a common sheet of stock material; the article is selected from a table or a chair.

In another aspect, the invention is contemplated to cover a method of making an article of furniture having any of the above described features, which may comprise steps of providing a sheet of stock material, cutting the first leg support structure and the second leg support structure from the sheet, interfitting each of the parts, and creating a force state that stabilizes the article of furniture and attaches the top, and may be further characterized by one or any combination of the following: all parts of the article of furniture are cut from the sheet of stock material; the method further includes a step of customizing the article of furniture; the method further includes a step of customizing the article of furniture with a photographic image, a logo, a name, or a combination thereof.

The invention also contemplates kits for any of the above described articles of furniture, which may include a folding carrying case that includes holders for the parts of the article of furniture, is fabricated from a sheet (optionally a single sheet) of a drapable material that folds to a thickness of less than 25 cm when all parts of the article of furniture are stored therein, or both.

Particularly preferred aspects of the invention contemplate an article of furniture comprising (or perhaps even consisting essentially of) at least one first leg support structure that includes a first pair of opposing and spaced apart slotted leg supports; at least one second leg support structure that includes a second pair of opposing and spaced apart slotted leg supports; the at least one first leg support structure being inter-fitted with the at least one second first leg support structure via an interference fit between the slotted leg supports to define a support assembly; a top that is supported by and attached to the support assembly; at least one cross support that connects opposing spaced apart slotted leg supports of the first or second pair with each other in a tensile state or a compressive state of sufficient magnitude that the supports are elastically deflected; and a nose portion on at least one pair of the slotted leg supports that laterally deflects and by its intrinsic elasticity applies a lateral force against an edge of the top; wherein due to the cross support and the nose portion on each of slotted leg support, a force state is realized in addition to any frictional force from the interference fit that attaches the top to the support assembly without the need for a mechanical fastener or adhesive and stabilizes the article of furniture. Such an article may be such that parts of the article of furniture are made from a common sheet of stock faced composite material that includes a densified thermoplastic polymeric core sandwiched between layers of metal, and the faced composite material has a thickness of less than about 10 mm; in its final assembled state, the article of furniture may includes an edge lip in at least one leg support structure having a height that is greater than about 10 mm that is above the top; or both; the article may be packaged in an unassembled state in a case fabricated from a sheet of a drapable material (e.g., a polymeric film) that folds to a thickness of less than 25 cm when all parts of the article of furniture are stored therein; the parts are stored in the case via elastomeric holders; or any combination thereof. For example, an article of furniture herein may comprise (or even consist essentially of) at least one first leg support structure that includes a first pair of opposing and spaced apart slotted leg supports, each of the opposing and spaced apart slotted leg supports including leg portions that have generally vertically oriented slots and a spanning portion that bridgingly connects the leg portions; at least one second leg support structure that includes a second pair of opposing and spaced apart slotted leg supports, each of the opposing and spaced apart slotted leg supports including leg portions that have generally vertically oriented slots and a spanning portion that bridgingly connects the leg portions; the at least one first leg support structure being inter-fitted with the at least one second first leg support structure via an interference fit between the generally vertically oriented slots of the slotted leg supports to define a support assembly; a top that includes a plurality of notches on at least two of its edges and is supported by and attached to the support assembly; at least one cross support that connects opposing spaced apart slotted leg supports of the first or second pair with each other in a tensile state or a compressive state of sufficient magnitude that the supports are elastically deflected; and a nose portion on an at least one of the opposing pairs of the slotted leg supports that laterally deflects and by its intrinsic elasticity applies a lateral force against an edge of the top via engagement of the nose portion with the notches of the top; wherein due to the cross support and the nose portion on each of slotted leg support, a force state is realized in addition to any frictional force from the interference fit that attaches the top to the support assembly without the need for a mechanical fastener or adhesive and stabilizes the article of furniture; wherein all parts of the article of furniture are made from a common sheet of stock faced composite material that includes a densified thermoplastic polymeric core sandwiched between layers of metal, and the faced composite material has a thickness of less than about 10 mm; the article of furniture includes an edge lip in at least one leg support structure having a height that is greater than about 10 mm that is above the top; and the article of furniture consists of an assembly of 7 individual parts or fewer (e.g., 6 individual parts).

BRIEF DESCRIPTION OF THE DRAWING

FIG. 1I is an overhead plan view to illustrate an example how a cross-support structure might be employed for applying an outward bowing force to at least two of the side support structures (shown here the long side support structures bowed outwardly).

FIG. 1J is a perspective view of another variation of the tables of the aforenoted FIGS. 1A-1I (shown without its top), illustrating another way in which more than one cross-support structure may be employed.

FIGS. 4A and 4B illustrate a device for transporting articles of furniture parts.

FIGS. 6A and 6B illustrate examples of cross supports.

FIG. 7 illustrates an example of a top shape.

FIGS. 8A and 8B illustrate an approach to an article of furniture that includes shelving, and also illustrates how supports may be varied in geometry.

DETAILED DESCRIPTION OF THE INVENTION

Figure 1A:
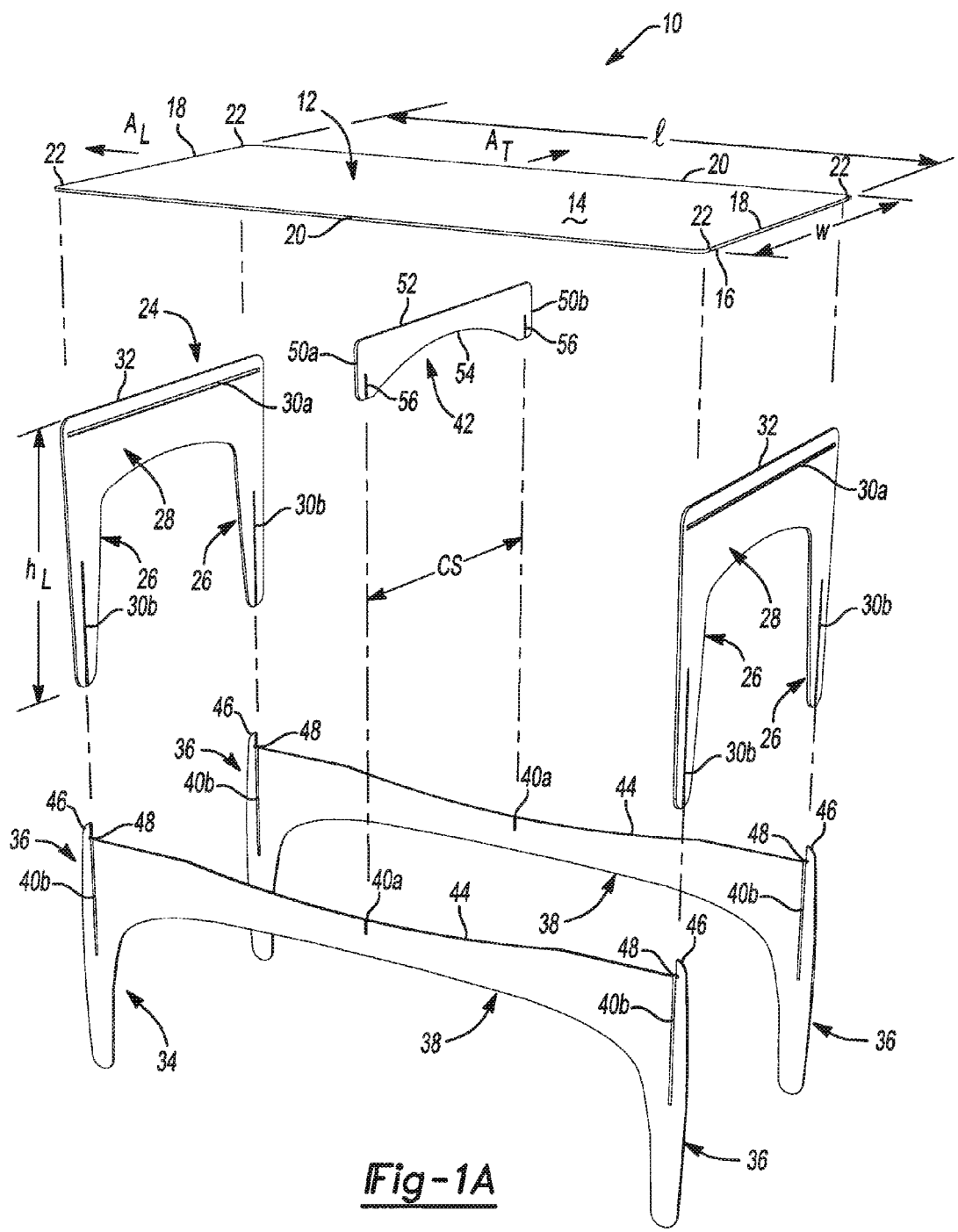
FIG. 1A is an exploded perspective view of an example of an article of furniture, namely a table, in accordance with the present teachings.

With reference to the drawings herein, and the accompanying detailed written description, the present invention pertains generally to unique articles of furniture, methods of making and using the same, methods of offering such articles of furniture for sale, packaging of such articles of furniture, and/or transportation of such articles of furniture.

In general, the articles of furniture herein will include a top (e.g., a table top or a seat surface), leg supports for supporting the top in spaced relation from a floor surface, and a structure for inducing a force state that stabilizes the top and the leg supports.

For example one preferred approach may employ a cross-support structure that forcibly connects at least two leg supports to each other, that induces a force to the top, or both. The leg supports and the cross-support structure (e.g., a cross-beam support and tensioning member) preferably include slots which are used to interconnect and join with each other (e.g., in a frictional engagement). Particularly preferred embodiments of the invention herein employ the cross-support structure so that a state of forces (tension, compression or both) is generated that imparts substantially improved stability to the overall article of furniture structure, thereby helping to resist wobble when the article of furniture is loaded, as compared with a similar article of furniture that is devoid of such cross-support structure.

As will be illustrated with reference to the examples herein, to induce the desired force state, particular preferred embodiments of the invention may employ particular slotting arrangements and dimensional fitting so that a state of forces (tension, compression or both) is realized by virtue of the co-action of the leg supports and the top that may also imparts substantially improved stability to the overall article of furniture structure, thereby helping to resist wobble when the article of furniture is loaded, as compared with a similar article of furniture that is devoid of such co-action.

As a result of the various structural features and interrelationships herein, it can be seen that a relatively strong and versatile article of furniture may realized from stock materials of surprisingly small thickness, or relatively light weight, or both. The invention herein thus lends itself especially well for providing one or more of portable transporting for the consumer or end user, convenient stowing for the consumer or end user, fuel efficient shipping, distribution, and warehousing for manufacturers, wholesalers and/or retailers.

Turning now to FIG. 1A-1D, there is shown an example of an article of furniture, and specifically a table 10 having a longitudinal axis $A_L$ and a transverse axis $A_T$. The table includes a top 12, which may be a panel or other member that has an upper surface 14 and an opposing lower surface 16 (see also FIG. 1F). As seen, the top may be generally flat and planar, with the upper surface 14 and the lower surface being substantially parallel. However, other forms may be employed in accordance with the teachings. Moreover, the top member will include an edge structure, such as a structure that includes a plurality of edges. As seen in FIGS. 1A-1D, for example, there is shown a pair of first edges 18, and a pair of second edges 20. The pair of first edges 18, and the pair of second edges 20 may have substantially the same length (e.g., to form generally a square top) or different length (e.g., to form generally a rectangular top, as exemplified in FIGS. 1A-1D). The pair of first edges 18, and the pair of second edges 20 may be generally orthogonally oriented relative to each other (as in FIGS. 1A-1D). They may be at an angle less than, and/or greater than, about 90° relative to each other (e.g., to form diamond, a trapezoid, a hexagon, an octagon, or other shape). Though the edges are shown as being substantially straight, they may include one or more curves (see, e.g., FIG. 7). The edges may be symmetrical or asymmetrical relative to a longitudinal axis ($A_L$) of the article of furniture, a transverse axis ($A_T$), or both. The top may also include one or a plurality of notches 22 in one or more of the edges.

Also shown is a leg support structure. A preferred leg support structure is a panel member, which may have substantially the same thickness as the top, as any other leg support structure employed in the article of furniture, or both. As illustrated in FIG. 1A, one such first leg support structure 24 may include a pair of spaced leg portions 26, and a spanning portion 28 that bridgingly connects (e.g., generally horizontally) the spaced leg portions. The spanning portion 28 may include a slot 30a (e.g., a horizontally oriented slot) for receiving an edge of the top. For example, the slot 30a may be substantially the width (w) of the top (or possibly of any tongue that may laterally project from the top). The leg portions 26 preferably include at least one slot 30b, such as a generally vertically extending slot (e.g., one that projects upwardly from a lower end). The slot preferably may be substantially linear and oriented generally in a single direction. The slot has a width that is approximately the same width as the thickness of an opposing leg portion with which it is joined in assembly, and (like other inter-fitted parts herein) preferably is sized slightly smaller than the thickness so that a frictional engagement is possible. Any suitable geometry may be employed for the leg support structure. As shown, the leg portions may taper to a more narrow width as ground level is approached, the spanning portion includes a concave arcuate bottom edge that continuously curves into the leg portions. Other geometries are also possible. The slots 30b will typically bisect the leg portions into opposing portions, which optionally may be of different size and/or shape relative to each other. In this manner, the respective portions may be employed for helping to effectively impart beam-like resistance to bending and assisting to realize the force state desired for stability. An upper edge 32 of the leg support structure preferably is disposed above the slot 30a, and will be disposed at a level higher than the top when assembly is complete.

One or more second leg support structure 34 that is configured so that it interconnects with one or more of the first leg support structure 24 may be similarly configured. An example of such second leg support structure 34 may include a pair of spaced leg portions 36, and a spanning portion 38 that bridgingly connects (e.g., generally horizontally) the spaced leg portions. The spanning portion 38 may include one or more cross support slot 40a (e.g., shown substantially at the midpoint of the second leg support structure 34 in FIG. 1A) for receiving one or more cross support 42. The leg portions 36 preferably include at least one slot 40b, such as a generally vertically extending slot (e.g., one that projects downwardly from an upper end). The slot 40b may be substantially linear and oriented generally in a single direction. The slot has a width that is approximately the same width as the thickness of an opposing leg portion with which it is joined in assembly.

Any suitable geometry may be employed for any of the leg support structures. For the leg support structures (first and/or second), as shown, the leg portions may taper to a more narrow width as ground level is approached, the spanning portion may include a concave arcuate bottom edge that continuously curves into the leg portions, a single spanning portion may be the only horizontally oriented structure that connects the spaced leg portions, an arcuate and/or straight outermost side edge may be employed on the leg portions, corners and/or ends may be rounded, or any combination thereof. Other geometries are also possible.

The slots 40*b* will typically bisect the leg portions into opposing portions that optionally may be of different size and/or shape relative to each other, as desired, for helping to effectively impart beam-like resistance to bending and assisting to realize the force state desired for stability. An upper edge 44, in which the slot 40*a* is shown, may include an arcuate intermediate section that provides a space (when assembled between the edge portion in that section and the bottom surface 16 of the top. Thus it is possible that the top of the slot 40*a* will also be spaced from the bottom surface of the top. A nose portion 46 may project from a corner of the structure, and preferably each upper corner (see also FIG. 1K). A notch 48 (e.g., a generally horizontally oriented notch, such as one having a depth less than about 10 mm, e.g., a depth of about 5 mm) may be included proximate the nose portion, which notch is generally juxtaposed with an end of the upper edge 44. The nose portion may include a bulk portion that spans laterally outward of the slot, and may have nose span (NS) to its outermost edge, which may be straight, but is shown as curved. The nose span may be at least about 5 mm, more preferably at least about 10 mm. The nose span may be less than about 50 mm, and more preferably less than about 35 mm. As seen in FIG. 1K, when a top is loaded into bearing relation with the nose portion (e.g., the top is loaded so that it inter-fits (e.g., its notch 22 inter-fits) with the notch 48), the nose portion may laterally deflect (shown on right hand side of FIG. 1K) from its at rest position (shown on left hand side of FIG. 1K). For example, the slot width SW may increase at the top of the slot by one or two times (e.g., for a material having a sheet thickness of about 6 mm or less and a nose span (NS) of about 5 to about 40 mm, the nose at its top may deflect about 1 to about 15 mm, more preferably about 3 to about 10 mm) its unloaded width. Due to its structure and material properties, in its deflected state, the nose portion possesses an intrinsic elasticity that causes it to apply a lateral force to the top, via its edge (e.g., a force in the direction as shown by the arrow of FIG. 1K).

The cross support 42, generally will be a cross beam support that includes ends 50*a*, 50*b*, a first edge 52 (e.g., an upper edge that may be flat or substantially the same shape as the bottom surface 16 of the top) and a second edge 54 (e.g., an arcuate edge as shown). Slots 56 preferably are included (e.g., substantially vertically oriented), such as slots made from the second edge 54. Preferably, the width of the slots is of sufficient the thickness relative to the leg supports to which they attach for providing frictional engagement therebetween. A particularly preferred approach is to space the slots 56 from each other so that when they are inter-fitted with the slots 40*a* of the second leg support structure they can either draw opposing spanning portions 38 inwardly (see generally FIGS. 1E, 1G, 1H, and 1J) or bow them outwardly (see generally FIG. 1I).

Figure 1B:
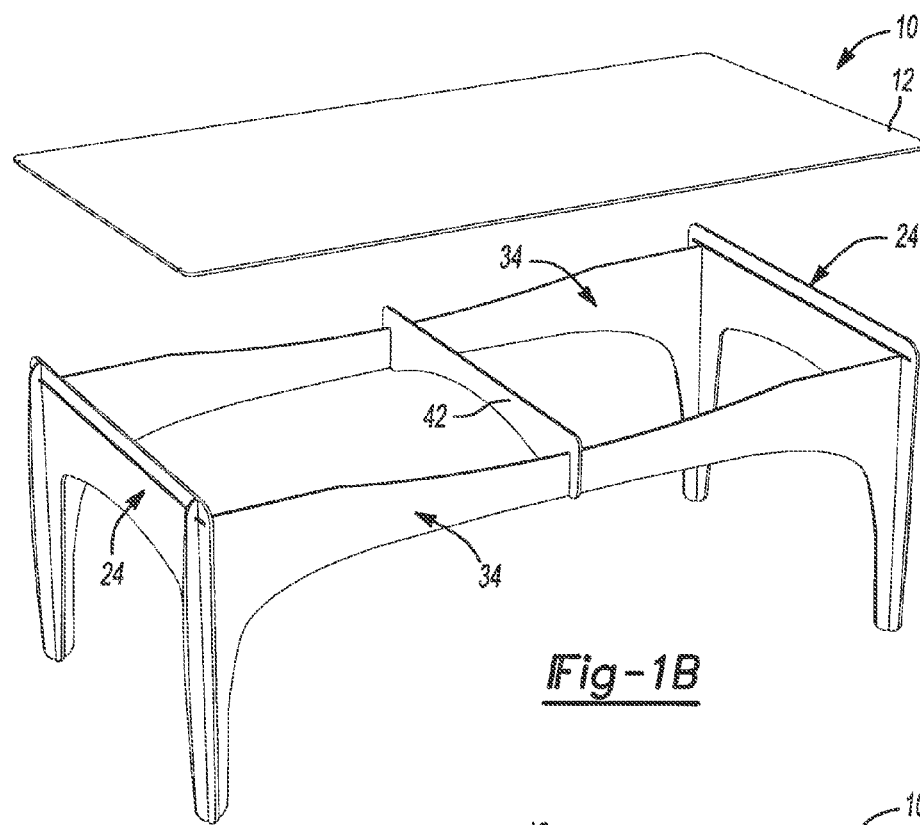
FIG. 1B is a perspective view of the table of FIG. 1A in a state of assembly including a top over a support assembly.

In FIG. 1B, there is shown a partial assembly of the table 10. It is seen that the opposing slots in first and second leg support structures (e.g., in the slots of the leg portions of each of the leg support structures) are inter-fitted with each other, such as by frictional engagement to form a support assembly. The respective leg support structures may be assembled to each other by consecutively attaching adjoining support structures until they are all interlocked. As seen, the first and second leg support structures may be substantially orthogonal to each other. The assembled leg portions thus criss-cross each other to form legs. The criss-cross configuration may such that the leg portions of each extend over at least half the entire length the legs, more preferably over at least 75% of the entire length of the legs, and still more preferably over at least 90% of the entire length of the legs. Thus, the criss-cross configuration may extend over substantially the entire length of the legs. One approach is to assemble all of the leg support structures and then assemble the cross support, followed thereafter by assembly of the top.

The cross support 42 is similarly inter-fitted by aligning its slots 56 with the slots 40*a* of the leg support structure. Frictional engagement likewise may be used to secure the cross support with each leg support structure. The first edge 52 of the cross support may be substantially juxtaposed with the slots 30*a* of each first leg support structure 24. The first edge 52 may also be positioned in its assembled state at a height that is different from the height of the slots 30*a*. For example, the first edge may be elevated above the slots, to bow the top convexly upward, as depicted schematically in FIG. 1F. It is also possible to remove the material of the cross support between the inner walls of the slots (e.g., between slots 56 in FIG. 6A). In this manner assembly is facilitated by orienting the cross support generally horizontally and rotating it into a vertical locked position. The slot depth may thus be substantially reduced as compared with FIG. 6A.

Figure 1C:
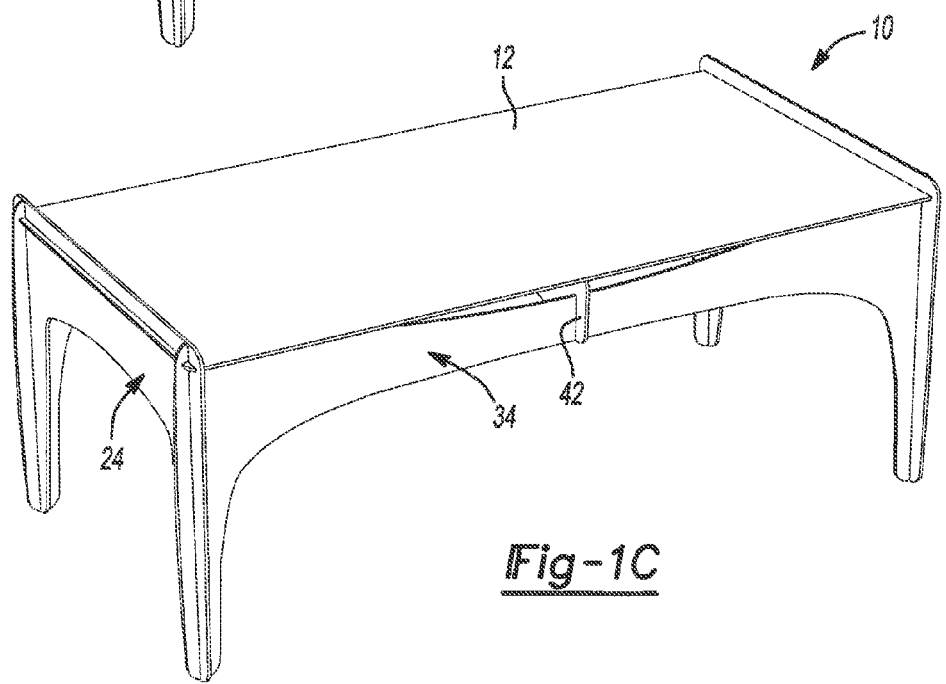
FIG. 1C is a perspective view of the table of FIGS. 1A and 1B is a complete assembled state.

As seen in FIG. 1C, the top 12 is placed onto the inter-fitted leg portions, and over any cross support 42. Preferably, the first edges 18 of the top will penetrate through the slots 30*a*. With reference also to FIG. 1K, the walls defining the notches 22 of the top and the notches 48 of the second leg support structure will abut against each other. Preferably, the co-acting inter-fit of the respective notches will also secure the top in a fixed position relative to the leg support structures. However, due to the configuration depicted herein, even in its final assembled state, the top may be free to slide against the cross support. That is, while it is contemplated that the top will be in a fixed position relative to the leg support structures, it is not necessarily required to be fixed to the cross support, and it may be displaceable relative thereto.

It is possible that the length of the table will slightly exceed the length of the distance between opposing notches 48. In this manner the nose portions 46 of the second leg support structure may deflect, and slightly spread elastically (e.g., less than about 1 cm each, and more preferably less than about 7 mm each (e.g., about 3 to about 5 mm). The intrinsic elasticity (i.e., the elasticity of the part that results due to the material selected and the part geometry) of the second leg support structure, in turn, causes a force to be applied to against the first edges 18 of the top, for assisting to secure the top and maintain stability of the article of furniture. It will be appreciated that other structures may be employed for this force application. The force, though illustrated as being applied longitudinally inward, may be applied in one or more other directions (e.g., the force may be applied transversely inward, transversely outward, longitudinally inward, longitudinally inward, or any combination that results in an overall force state applied to the top).

The assembly of the articles of furniture herein should thus be understandable to the skilled artisan in view of the present teachings, including the teachings of FIG. 2 of U.S. Provisional application Ser. No. 60/971,651 filed Sep. 12, 2007, or in FIG. 2 of U.S. Provisional application Ser. No. 61/034,290, filed Mar. 6, 2008, both incorporated by reference herein. The order of assembly may be such that articles of furniture herein may be assembled so that the cross support is assembled last. The method of assembly thus may include friction fitting the slots 30b and 40b. Top 12 fits into horizontal slots 30a, and notches 22 inter-fit with notches 48. Upon assembly, the cross support 42 applies a force to squeeze (or bow outwardly, as the case may be) the leg supports 34, and the nose portions apply a lateral force to the top 12. The individual parts are thus locked securely in place, via the slotted friction fits. Some or all of the assembly steps may take place at room temperature.

Other variations of the present invention are also possible. For example, FIG. 1E illustrates a cross support that pulls the second leg support structures 34 toward each other, thereby effectively placing the cross support 42 in a state of tension (e.g., from the intrinsic elasticity of the second leg support structures 34). FIG. 1G illustrates a longitudinally extending cross support 42. It may operate to pull the first leg support structures 24 toward each other, thereby effectively placing the cross support 42 in a state of tension. FIG. 1H illustrates a cross support that includes a transversely extending cross support 42 and a longitudinally extending cross support 42. Each of these cross supports may be attached to place them in tension, so that each of the leg support structures (first and second) are bowed inwardly.

Of course, as has been discussed, any of the cross supports (longitudinally extending, transversely extending, or both), may be configured to place them in compression from the intrinsic elasticity of the connected leg support structures, such as is illustrated in FIG. 1I, thereby effectively bowing the connected leg support structures outward. FIG. 1J illustrates that more than one cross support structure 42 may be employed in either or both of the longitudinal or transverse direction. If it is desired to create a force state from the cross supports, each such cross support may be employed in tension or compression in accordance with the teachings herein.

For this embodiment and the other embodiments disclosed herein, the slots 30a, 30b, 40a or 40b generally will extend into the leg support from one of the peripheral edges. Though shown oriented from top to bottom, or bottom to top, the direction of opposing slots may be reversed as desired. Thus, slot 40b may extend upward from bottom and the slot 30b downward from the top, in contrast with that shown.

Without intending to be bound by theory, one or any combination of following structural features contributes to aid in strength and/or stability of the article of furniture, above described, and as to all embodiments herein: the arcuate edge geometry of individual support parts locally defines arches that support applied loads; the presence of a laterally applied force on the edges of the top (e.g., from the tendency of the nose portions to want to return to their unstressed state); the presence of tension in the upper surface of the top (e.g., from the cross support bowing it upward as in FIG. 1F); or the force state derived from the cross supports; the ability of the bottom surface of the top to move relative to any underlying support when assembled.

Further, without intending to be bound by theory, it will be appreciated from the above teachings that the overall force state that is created will include a frictional force. However, as to all embodiments herein, it is also contemplated that the force state will include forces in addition to frictional forces. For example, it may include tensile or compressive forces that are induced by the intrinsic material properties of the parts, the geometry of the parts, or both. The overall force state may be sufficiently large that deflection of parts occurs, beyond any incidental or microscopic deflection that may arise due to a friction fit (e.g., due to a friction fit obtained from manual assembly of parts by an average strength adult female assembler having a height of about 155 to about 170 cm height and weighing about 60 to about 75 kg, without using any hand tools). By way of illustration, as to all embodiments herein, for articles of furniture herein that have a top that has a side dimension that ranges from about 20 cm to about 300 cm in length, it is possible that the force state that is created results in an outward deflection (as measured from its initial un-stressed position) of one or each nose portion of the leg support structure in an amount of at least about 0.2 mm, more preferably at least about 0.5 mm, and still more preferably at least about 1 mm. It is possible that the force state that is create results in an outward deflection (as measured from its initial un-stressed position) of one or each nose portion of the leg support structure in an amount of less than about 10 mm, more preferably less than 5 mm, and still more preferably less than about 2.0 mm.

For all embodiments of articles of furniture herein that have a top that ranges from about 20 cm to about 300 cm in length, it is possible that the force state that is created by a cross support (e.g., support 42) results in a deflection (inward or outward, relative to its flat initial state) of a mid-point of a spanning portion of the connected leg support structures (e.g., substantially at the location shown in FIG. 1A for the slots 40a) of an amount of at least about 0.5 mm, more preferably at least about 1 mm, and still more preferably at least about 2 mm. It is possible that the force state that is created by a cross support (e.g., support 42) results in a deflection (inward or outward) of a mid-point of a spanning portion of the connected leg support structures of an amount of less than about 80 mm, more preferably less than about 60 mm, and still more preferably at least about 40 mm.

As the skilled artisan will recognize from the above, in a broad sense the invention shares one or more common features that help to realize advantages over existing articles of furniture. By way of example, all embodiments of the present invention may share one or more of the following features: the construction achieves a stable article of furniture from relatively few parts, most or all of which are panel structures derived from sheets of stock material that have a thickness no greater than about 20 mm, and more preferably no greater than 10 mm; the individual parts (e.g., individual panel members) that are employed to define the legs, the top, and the cross beam support may be free of any hinge, free of any crease, free of any mechanical fastener (e.g., screws, nails, pins, rods, dowels, clips, latches, or the like), free of any adhesive, or any combination thereof. The articles of furniture of the present invention in their final assembled state may also be free of any hinge, free of any crease, free of any mechanical fastener (e.g., screws, nails, pins, rods, dowels, clips, latches, or the like), free of any adhesive, or any combination thereof. The tables of the present invention in their final assembled state may be free of any connected bench or seating surface. The articles of furniture of the present invention may be free of any slotted legs that are located in a central region of the articles (e.g., slotted legs may be present only in the side or end portions of the articles). Support for the top member of the articles of furniture herein may be derived solely from the slotted legs and any cross beam support. Any cross beam support may be suspended above the floor (or other horizontal support surface) and be free of any direct contact with the floor (or other horizontal support surface).

As will be appreciated from the teachings herein, the invention contemplates the fabrication of articles of furniture from an assembly of patterns or cut outs that create an assembly system that can be friction fit together to create a solid stable structure, possibly without any mechanical fasteners. Articles of furniture herein can then be easily disassembled and reassembled.

Figure 3A:
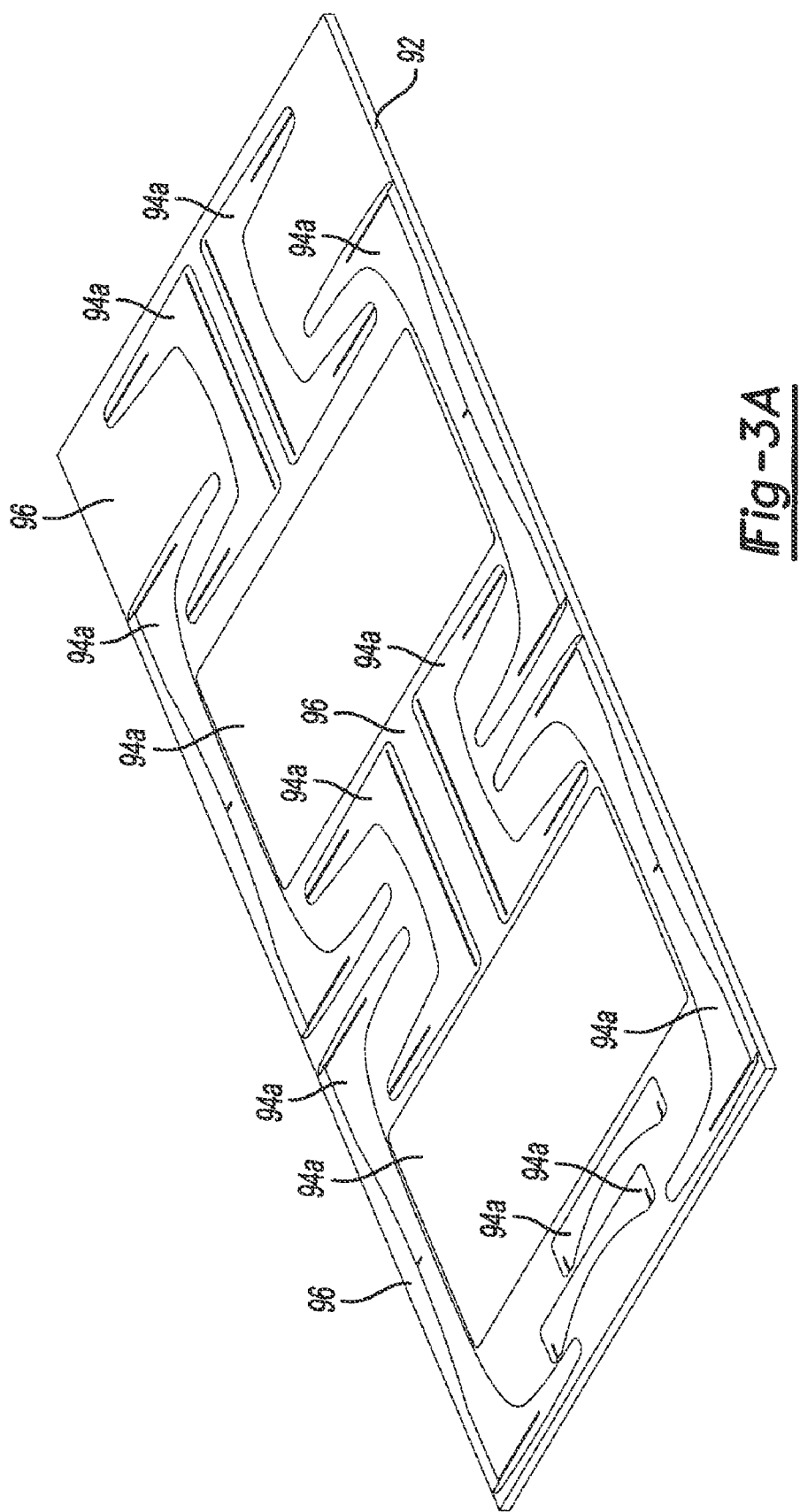
FIGS. 3A and 3B illustrate how articles of furniture may be made from sheet stock material.
Figure 3B:
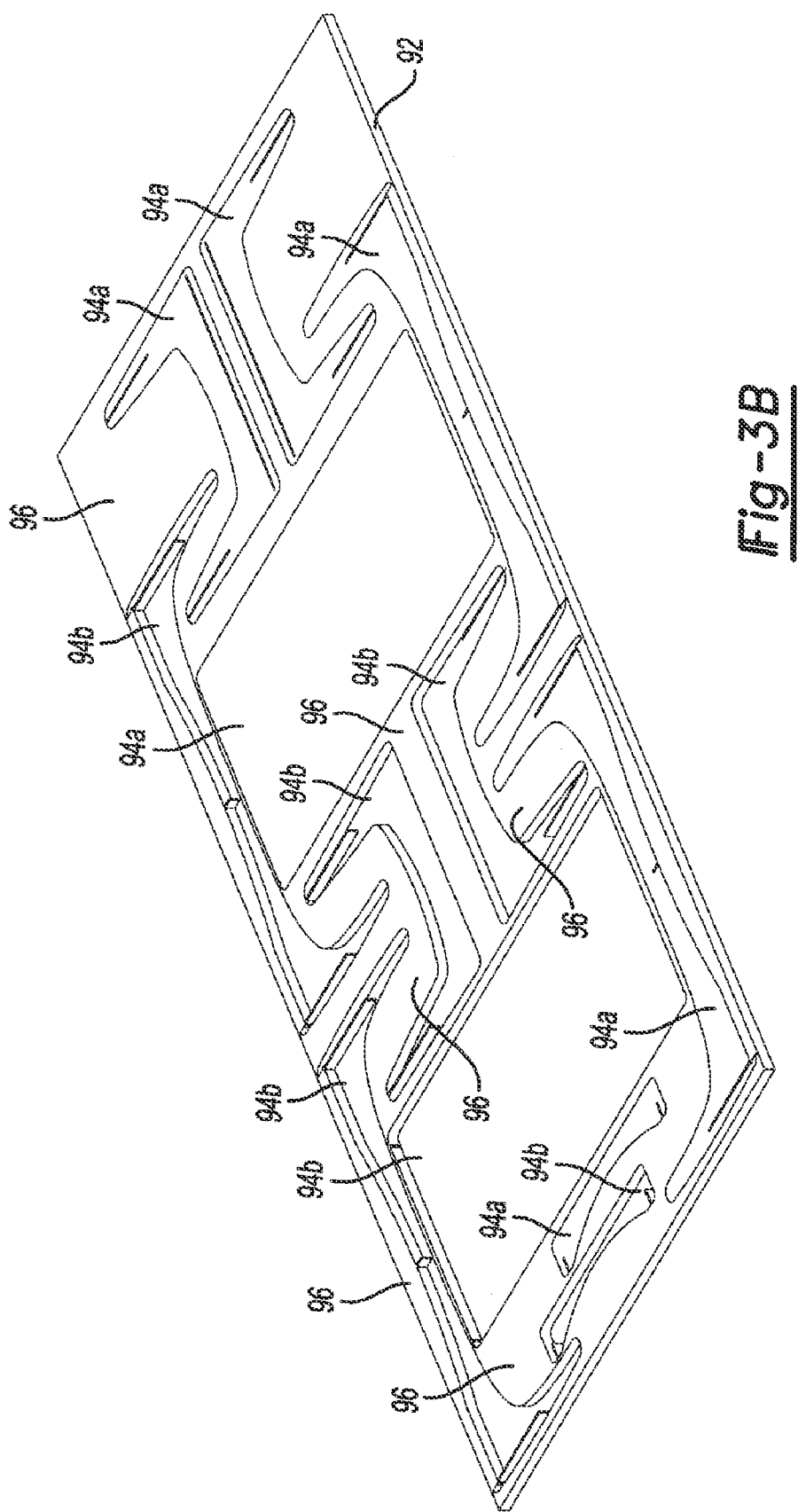
Figure 5A:
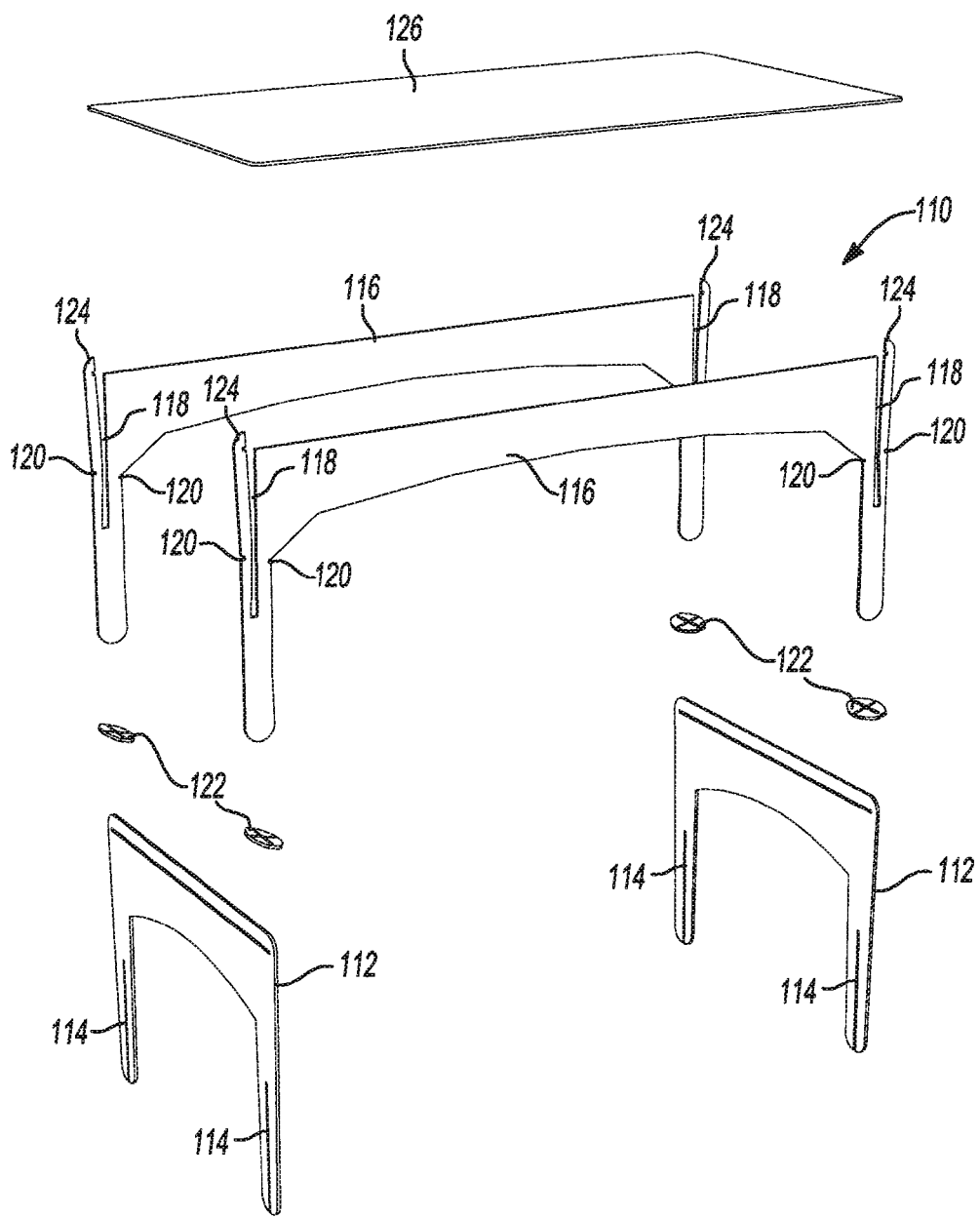
FIGS. 5A-5D illustrate another approach for assembling parts to form articles of furniture herein.
Figure 5B:
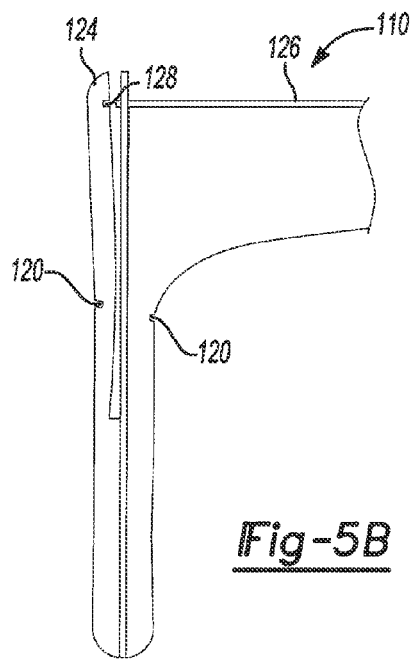
Figure 5C:
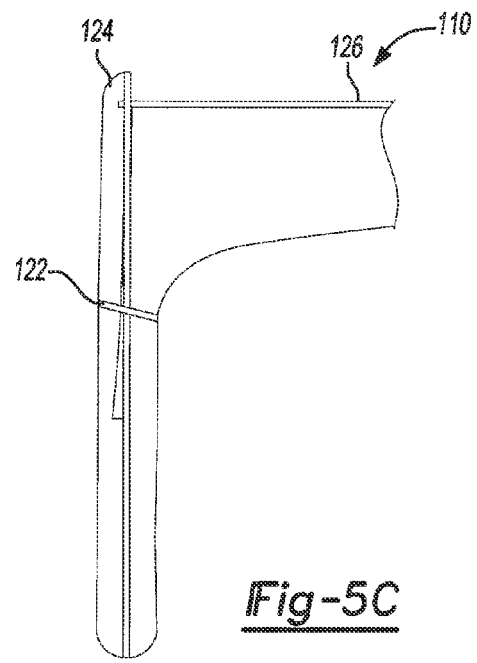
Figure 5D:
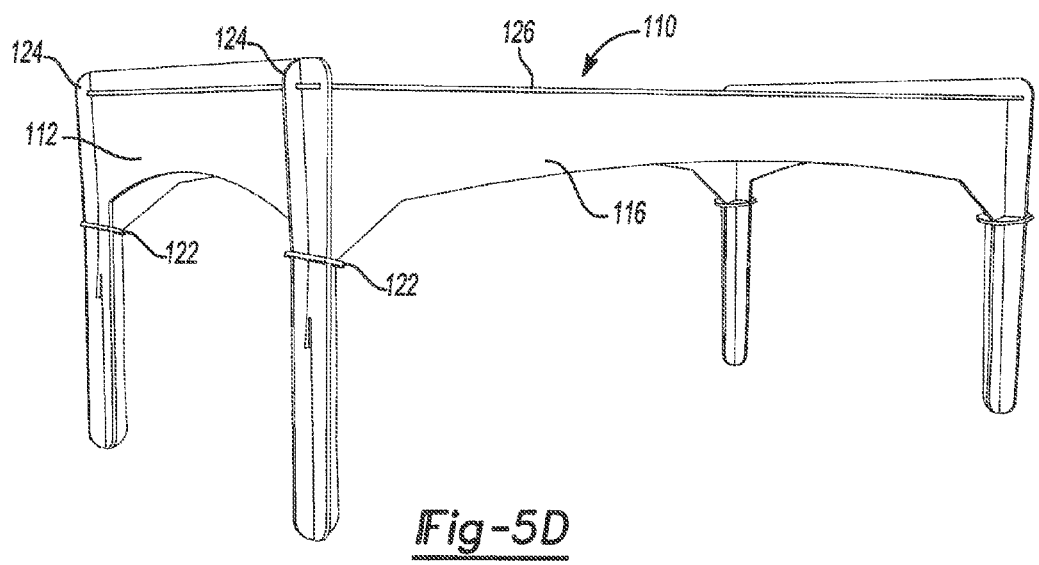

The stock materials from which the support parts (or even the tops) may be made can be any suitable material. However, it is believed that one advantage that can be realized from the present invention is due to the employment of sheet stock material from which the parts are cut. For example, it is contemplated that a one or more sheets of stock material are provided. Support parts and/or a top are cut from the sheet stock and thereafter assembled. Thus, it is possible that some or even all parts of the articles of furniture may be cut from the same sheet of stock material, have substantially the same thickness or both. Referring to FIGS. 3A and 3B, there is seen an example of how a sheet of stock material may be cut into individual parts that can be assembled together to form an article of furniture according to the present teachings.

The stock material may be any suitable dimensions. Desirably it will have a thickness less than about 30 mm, and possibly even less than about 20 mm or even less than about 10 mm. For example, it may be about 5 mm or less. The stock material may have dimensions from about 1 m to about 1.5 m width and about 1 to about 2.2 m length (e.g., a 4 foot by 8 foot sheet). The stock material may be substantially homogeneous material. It may be a composite material. For example, it may be a faced material, or other laminate. It may be a coated material. One approach herein contemplates using an aluminum faced composite board material called Dibond® as the base material for the project. For example, a polymeric core (e.g., a foamed or unfoamed polyolefin such as polyethylene, polyurethane, or other polymeric material) having one or more faces of a metal layer (brushed, polished or coated (e.g., by stove lacquering) having a thickness of about 0.1 to about 1 mm (e.g., about 0.3 to about 0.5 mm). Wood products may be employed (e.g., solid wood, plywood, particle board or otherwise). Other materials may be used, such as metals, polymeric materials or a combination. Polymeric materials may be used with organic or inorganic reinforcement or filler (e.g., glass fiber or glass filled). A glass top piece may also be employed. The materials used typically will include a core material with may be plastic, metal, wood, post-consumer recycled material, any combination thereof or the like. The core may be substantially fully densified, or porous (e.g., it may include a polymeric foam material, such as a polyurethane foam, an polystyrene foam or otherwise). The core may have a density per ASTM D792-08 of about 0.85 to about 0.98 g/cm$^2$ (e.g., about 0.92 g/cm$^2$).

The facing may be metal, plastic, wood veneer, woven, unwoven, or any combination thereof. The facing may be coated or uncoated. The facing may have a thickness on the order of about 0.1 to about 1 mm (e.g., about 0.3 to about 0.5 mm). Thicker or thinner facings are possible too. The overall thickness of the materials for making the articles herein will generally be less than about 10 mm, e.g., about 2 mm to about 6 mm. Different materials may be employed for the individual components of the furniture herein. For example, a faced composite board may be employed for a tabletop, with one or more supports or retaining means being made of wood, or vice versa. Other combinations are also possible.

The materials of the stock material may be deformable. Thus, it is possible that the methods herein may include a step of forming (e.g., thermoforming, embossing or otherwise) the stock material into a three-dimensional configuration from its originally flat state.

The stock material may exhibit a modulus of elasticity (e.g., per ASTM D638) of at least about 50,000 N/mm$^2$, and more preferably at least about 60,000 N/mm$^2$ (e.g., about 70,000 N/mm$^2$).

Another aspect of the invention is directed toward the portability of the articles and their individual parts. In this regard, the present invention also contemplates kits, which may include the individual parts described herein and optionally a carrying case. The kit may thus include a top, a plurality of leg supports and optionally a cross support, all as described generally herein. The kit, in unassembled form, is packaged generally flat so that the height of the package is less than about 25 cm, or even less than about 20 cm, and more preferably less than about 15 cm, or even less than about 10 cm. A kit may include or consist of the individual parts described herein and a carrying case. The kit may weigh less than about 20 kg, and more preferably less than about 15 kg (e.g., less than about 10 kg, or even less than about 5 kg). The kit may be packaged so that it has a surface area for its largest outermost surface a surface area of at least about 0.2 m$^2$, and more preferably at least about 0.3 m$^2$. The kit may be packaged so that it has a surface area for its largest outermost surface a surface area of less than about 2 m$^2$, and more preferably at least about 1.2 m$^2$.

For example, the articles and their individual parts are relatively lightweight and can be packaged as a kit in a low profile package that has a relatively thin height. The kit may be provided with a carrying case, such as a case that includes a plurality of holders for receiving the individual parts in a predetermined location. The carrying case may include one or more of a handle, a strap or some other suitable carrying or gripping device. It may include a suitable closure for maintaining it in a closed position. The carrying case may include one or a plurality of panels that allow the case to be opened or closed. One example of a preferred case is illustrated in FIGS. 4A and 4B, which shall be discussed herein.

Figure 2A:
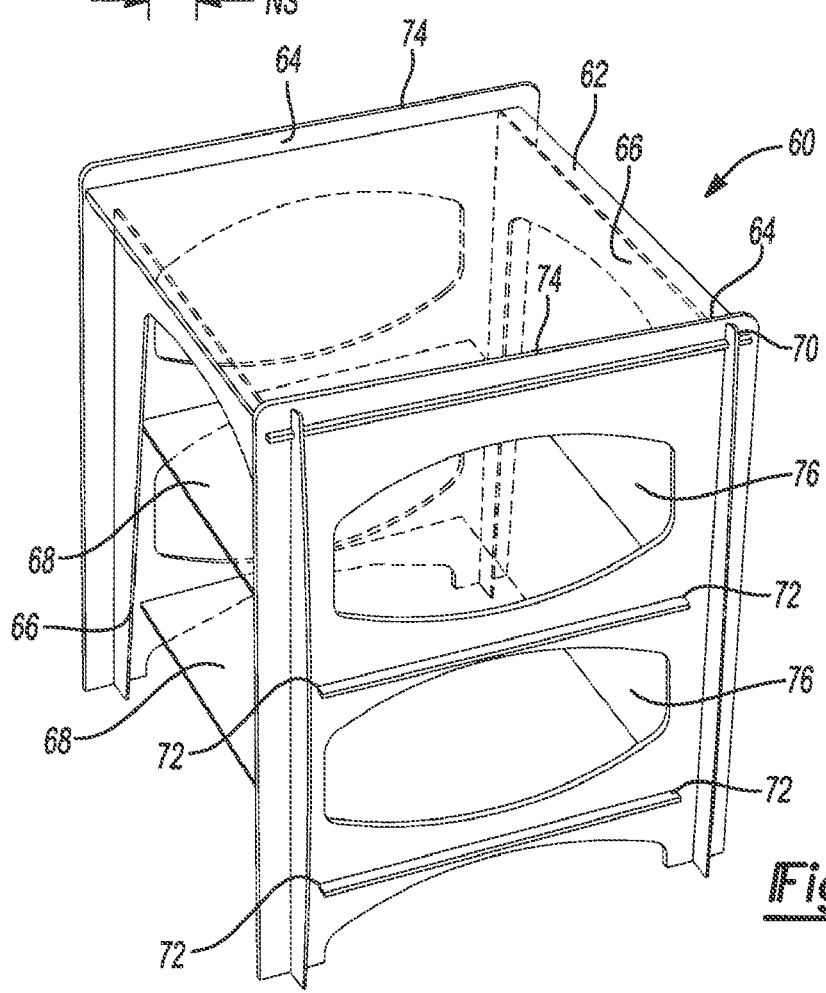
FIG. 2A illustrates an example of an article of furniture that includes shelving.

Turning now to FIGS. 2A-2D, there are illustrated additional examples of articles of furniture in accordance with the invention. FIG. 2A illustrates a table 60 that includes a top 62, an opposing pair of first leg support structures 64, an opposing pair of second leg support structures 66. This example illustrates the optional use of one or more shelves 68 that connect between one or both of the pair of the first or second leg support structures. It is possible that a cross support, such as the cross supports 42 illustrated previously, may be employed in accordance with the teachings herein. The table 60 may be free of such cross support structure. Preferably stability is achieved by at least employing a structure as in the previously discussed embodiments, by which a nose portion 70 with an associated notch (such as notch 48) engages an opposing notch (such as notch 22) in the top 62. The leg support structures are interfitted by slots, preferably so that frictional engagement is achieved. Each of the shelves 68 will penetrate through the opposing pair of first leg support structures 64, such as by a horizontal slot. The shelves 68 may have locking notches, akin to the notches 22 previously taught, that engage the opposing pair of first leg support structures 64, such as at locking sites 72. The spacing between the shelf locking notches may be less than or greater than the width between upper edges 74 of each first leg support structure 64, so that a tension or compression state is realized for the assembly. Each of the opposing pair of first leg support structures 64 may have one or more openings 76.

Articles of furniture herein may include one or more features for individualizing or otherwise distinguishing the articles of furniture. For example, a possible step of distinguishing articles of furniture by applying a design (e.g., a graphic design) may be employed. For example, articles of furniture may be fabricated to include a design (e.g., a graphic design) by printing the design on one or more surfaces of the article of furniture, etching a design into one or more surfaces of the article of furniture, cutting out a design from the article of furniture, applying a design as an appliqué or decal, or any combination thereof. The graphic design may include a photographic image, alphanumeric text, an artistic work, a logo (e.g., a logo for a team, school, or other organization), or any combination.

Figure 2B:
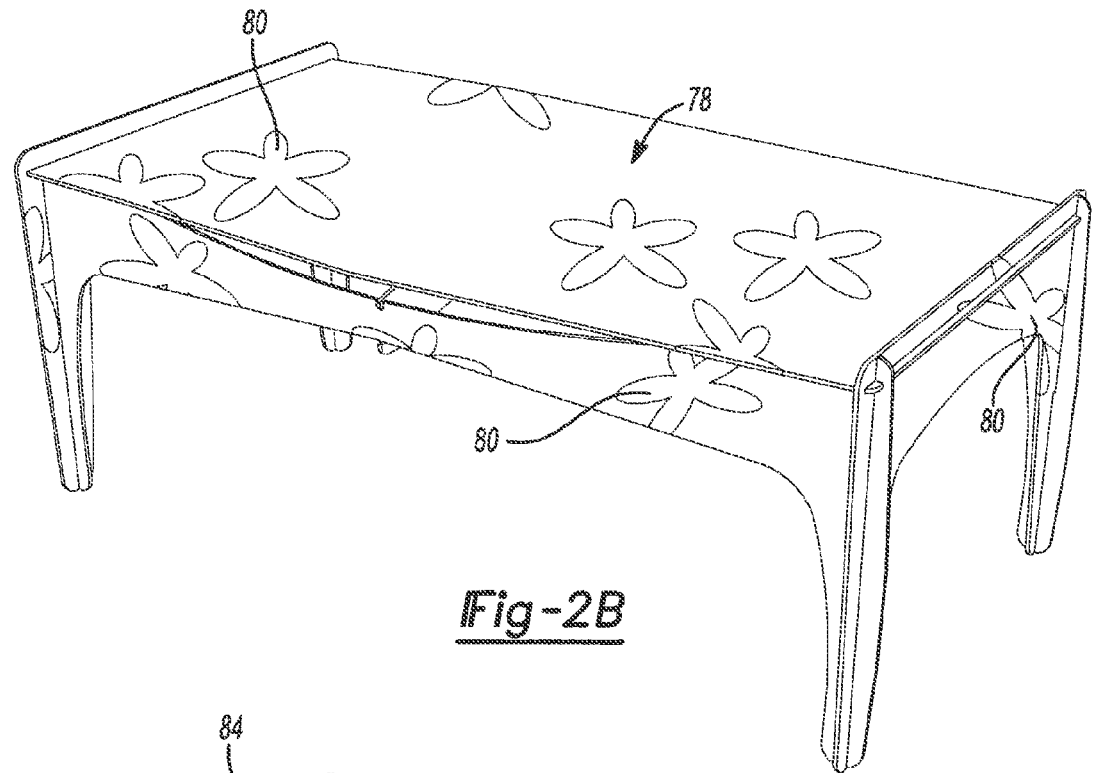
FIGS. 2B-2D illustrate examples of variations of designs of tables and/or individual parts of the articles of furniture herein.

For example, FIG. 2B illustrates a table 78 that includes an applied graphic design 80 on one or more of its surfaces. The graphic design may be a custom design, or a stock design. The design may be printed on the table surface, etched into the table surface, applied as an appliqué or decal, or any combination. The graphic design may include a photographic image, alphanumeric text, an artistic work, a logo (e.g., a logo for a team, school, or other organization), an ordered pattern, a random pattern, or any combination.

Figure 2C:
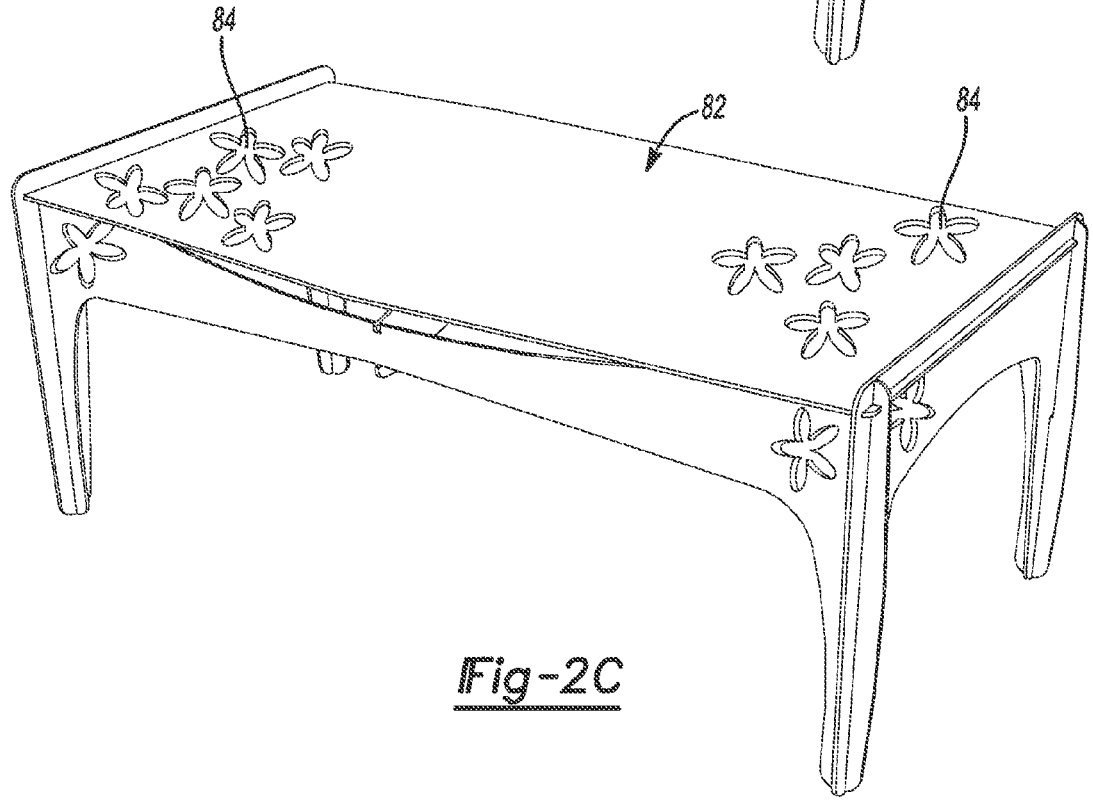

By way of further example, FIG. 2C illustrates a table 82 that that includes an cut-out graphic design 84 through one or more of its surfaces (e.g., cutouts from the top). The graphic design may be a custom design, or a stock design. The design may be cut out of the table material. The graphic design may include a photographic image, alphanumeric text, an artistic work, a logo (e.g., a logo for a team, school, or other organization), or any combination.

Figure 2D:
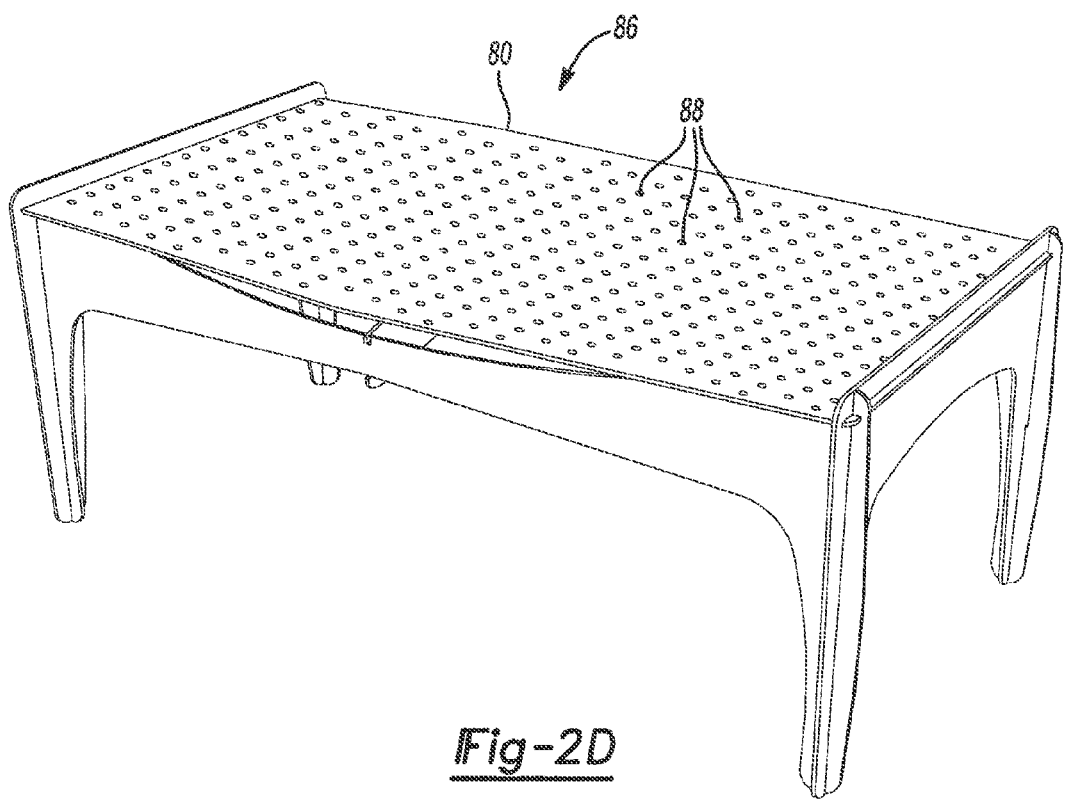

By way of yet further example, FIG. 2D illustrates a table 86 that includes a plurality of openings 88 in a top 90. The openings are shown scattered over substantially the entire surface of the top 90, and include an ordered pattern (a repetitious pattern, such as one having holes of relatively constant sizing, spacing or both). It is possible that the openings are located on only a portion of the table, may be of different sizes, may be of different spacings, or any combination thereof. Such tops may be employed for a gaming. For example, figurines or other game pieces or figurines may include one or more pegs on a bottom surface that are inserted into the openings 88, for helping to fix the position of the pieces. Another possible use of such a table may involve threading a string, or other elongated fiber through the openings to form a design that includes a plurality of interconnected fibers threaded through the openings (e.g., elongated yarn, string, wire or cable for creating a threaded or woven design). Similarly, pegged projecting members may extend upwardly from the top, which can be employed for connecting a plurality of threads. Methods herein thus also contemplate possible steps of temporarily and removably placing pegged items, elongated fiber members or both in the openings. Combinations of the embodiments of any of FIGS. 2B, 2C and 2D are also contemplated.

As discussed previously, articles of furniture herein may be made from a one or more sheets of stock material. The shapes of the individual parts may be cut into the sheet, and the parts then separated from the sheet. It is possible that a small amount of sheet material remains for tethering the parts to the sheet, so that the sheet effectively serves as a handling frame. By way of illustration, FIGS. 3A and 3B show a sheet 92 of stock material. The sheet has individual parts 94a cut in the sheet 92. Excess material (illustrated in various locations by reference numeral 96) of the sheet 92 can be used as a frame for gripping or otherwise manipulating sheet, with or without the parts held therein. The parts can be cut in any suitable manner. They may be made by a powered cutting tool (e.g., a saw, a router, die-cutting or otherwise); they may be laser cut; scored, or otherwise cut. It is possible that the resulting frame, upon removal of the individual parts, can be re-used, such as by hanging it on a wall as a wall-hanging, or other ornamental trim, having a motif similar to the article of furniture. FIG. 3B illustrates the frame with some of the individual parts removed from the frame, leaving openings 94b, where the parts used to be.

As gleaned from the above, and as mentioned previously, among the possible advantages and benefits of the various embodiments of the present invention is the relative ease with which the individual parts are provided, assembled, disassembled, handled and/or transported. The relatively thin nature of the walls of the individual parts lend them well to stacking so that a thin profile may still be maintained. This makes for attractive packaging and transport from one or more of a manufacturer, during sales distribution, for end-consumers. Parts may be packaged in relatively flat packages (e.g., a generally rectangular box). For example, the height of the package (e.g., a rectangular box package) may be less than 30% of the width and/or length of the package, be less than 20% of the width and/or length of the package, or even be less than 20% of the width and/or length of the package.

Packaging may be in accordance with the teachings of FIG. 21 of U.S. Provisional application Ser. No. 61/034,290, filed Mar. 6, 2008, incorporated by reference herein. For example, as seen in the present FIGS. 4A and 4B, one preferred package may be a case 98 suitable for transporting and/or storing the parts of the articles of furniture herein may include a case including a suitable handle, strap or other handling device 100, individual parts 102, and a plurality of holders 104 for the individual parts 102. By way of example, a case may be provided. The case may include a layer of a textile (e.g., a woven material, a nonwoven textile material or both), a plastic, a paper product material, a natural fiber material, wood, metal, ceramic, or any combination thereof. Preferably, the material is in a form that it is drapable. For example it may be a film of less than about 30 mils (less than about 0.8 mm) (e.g., on the order of about 20 mils (about 0.5 mm). Examples of materials may include one or more thermoplastic sheets (e.g., vinyls, polyolefins such as polypropylene and/or polyethylene, polyethylene terephthalate, laminates or weaves of the above). The material may be made from post-consumer recycled materials. The material may be bio-degradable. It may be based upon polylactic acid, another starch-derived material, or some other agricultural by-product or renewable raw material; it being appreciated too that any of the components of the furniture taught herein may also be made of such biodegradable material or renewable raw material. The material may be a microporous film. That material may be transparent over some or all of its surface so that the components that it carries are visibly exposed. Any seams may be sealed (e.g., by a tape) or concealed. It may be scored or hinged along one or more fold lines. It may include one or more closure mechanisms 106 at one or more locations about its periphery (e.g., one or more attachment device at the corners (as shown) such as snaps, zippers, hooks, buckles, clips, hook and loop fasteners, or otherwise). The inner surface of the case may include one or more means for holding components (e.g., holders 104) of the table or other article of furniture. The holding means may include one or more straps (e.g., elastomeric holders, such as straps of about 2.5 cm width (about 1 inch)), one or more pockets, one or more tethers, or any combination thereof. As indicated the case may include one or more handles 100 (e.g., a strap or grip handle located along an outer edge). A handle may be located toward a central portion of an external wall of the case as well for improving ergonomic efficiency. In use, the components are secured in place on an inside wall of the case, the wall is folded about one or more folds 108 and it is secured shut, such as with the closure. Though the use of attached hinges (with associated pivot pins) may be employed, one preferred approach is to employ a single sheet of material for defining the case.

The creation of a stabilizing force state may be achieved using any of a number of structures. As has been illustrated previously, the relative dimensions, and/or selection of locations of notches, of individual parts can be employed for inducing a force condition that helps maintain stability and/or strength of the resulting articles. One or more added hardware devices may also be employed for helping to achieve such force condition. One possible approach is to employ a ring or other device that applies peripheral clamping or banding force to legs of the article of furniture. With reference to FIGS. 5A-5D there is shown a table 110, constructed similarly to that of FIGS. 1A-1D (but shown optionally without a cross support) with a first leg support structure 112 with slots 114 in spaced legs, and a second leg support structure 116 with slots 118 in spaced legs, and optionally including one or more notches 120 into which a ring 122 may be placed for bringing a nose portion 124 of the second leg support structures into bearing relationship with top 126 (e.g., for applying pressure to edges of the top, possible by way of one or more notches 128 in the top, the leg support or both, as taught previously).

FIGS. 5A-5D also illustrate another geometry that may be employed for slots in any of the embodiments herein. It is seen that the slots 118 may be defined by opposing walls that (in their unloaded, initial state) vary in spacing along the length of the slot (here shown going from wider spacing at the top to narrower spacing in the central part, back to wider spacing at the base of the slot). In contrast, as with other embodiments depicted, the slots 114 are shown as being of generally parallel opposing walls so that spacing is substantially constant along the slot length.

With reference to FIGS. 6A and 6B, there are shown examples of cross supports. FIG. 6A illustrates a cross support 42, as in the embodiments of FIGS. 1A-D, E, G, and H, 3A and 3B, 9 and 10, without limitation. As discussed, it is possible that material may be removed between the slots 516 for facilitating assembly. For example, the bottom edge 54 may be substantially flat and/or extend across the support from a point substantially adjoining the deepest part of the slot. FIG. 6B illustrates a cross support 42', as in the embodiments (without limitation) of FIGS. 2B, 2C, 2D or as might be employed for creating the force state of FIG. 1I. The cross support 42' of FIG. 6B includes a lateral side wall 128 that is flanked in at least one of its ends by one or more tongues 130, and particularly laterally projecting tongues. The side walls are configured to bear against a leg support structure, such as along a spanning portion of the leg support structure. The cross support 42' of FIG. 6B illustrates how cross supports need not necessarily include a straight upper edge such as first edge 52 of the support. An upper edge 132 might engage a bottom surface of a top over only a portion of its length, e.g., it may include one or a plurality of lower sections 134 that may be spaced further from an adjoining top than another section of the upper edge. It should be appreciated that even though a particular cross support 42 or 42' may be shown herein for a particular embodiment, it is possible that the other support may be substituted. For example, the embodiment of FIGS. 1A-D, E, G, and H, 3A and 3B, 9 and 10 may employ support 42' of FIG. 6B (and may result in an outward bowing of leg supports). Further, the embodiments of FIGS. 2B, 2C, 2D may use support 42 of FIG. 6A instead of support 42'. Other cross supports described herein likewise may be interchanged.

FIG. 7 illustrates an article of furniture 136, including a top 138. The top is depicted to illustrate how the edges of the tops need not all be straight. As seen, one or more edges 140 may be generally straight, one or more edges 142 may be generally arcuate, or both. Edges may employ a combination of one or more arcuate sections and one or more generally straight sections.

With reference to FIGS. 8A and 8B, another variation is disclosed. In this variation, it is illustrated how the articles of furniture herein may include more than four legs (e.g., six legs as shown), how a shelf may be supported in an article of furniture, how a shelf that is smaller than any tabletop may be supported along only a portion of the length of the article of furniture, how leg support structures on the end may differ in structure relative to each other, how a shelf may be supported by an intermediate support structure that also co-act with a long side support structure to define a leg, or any combination of the foregoing features (with the complete combination of the above optional features being illustrated in FIGS. 8A and 8B). As seen in FIGS. 8A and 8B, a table 144 may include a shelf 146, such as a shelf that has notches 148 that engage support structures, such as a first leg support end structure 150. The first leg support end structure 150 is shown with a slot 152 (e.g., a slot that is structured and functions like slot 30a previously described), through which a top (not shown) may be inserted (e.g., as in the embodiment of FIGS. 1A-1D). One or more slots 154 may be included for receiving the shelf 146. Optionally, an opening 156 may be formed in the first leg support end structure 150. An intermediate cross support structure 158 may be employed, which may optionally have slotted leg portions 160 that extend toward or even all the way to a floor surface. The intermediate cross support structure 158 may also include a slot 162, through which the shelf may be inserted and against which the notches 148 may bear. Another leg support end structure 150' may be employed. As shown, it has a structure like the first leg support structure 24 of the embodiment of FIGS. 1A-1D. However, it may be configured like the first leg support end structure 150, or in some other configuration. A side support structure 164 may be employed. By way of example, it may be similar to the second leg support structure 34 of the embodiment of FIGS. 1A-1D, configured to include a support for the shelf 146. For example, it is shown with an optional slotted leg portion 166 that inter-fits with the slotted leg portions 160.

The intermediate cross support structure 158 may be dimensioned in a manner functionally similar to that of the cross supports 42(42') previously discussed so that when it is inter-fitted with the side support structure 164 it bows the side support structures outwardly or squeezes inwardly for applying a desired force.

Figure 9:
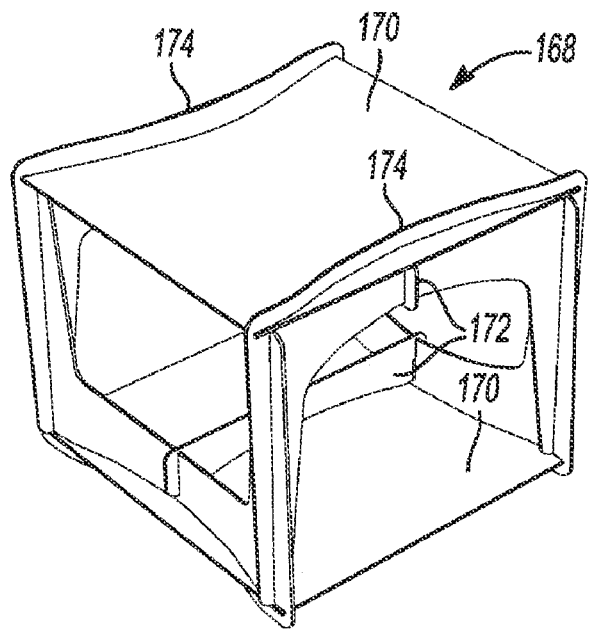
FIG. 9 illustrates another example of an article of furniture, in which rotational symmetry is possible.

FIG. 9 illustrates an embodiment of an article of furniture 168 that has rotational symmetry. It includes a pair of opposing tops 170. A pair of cross supports 172 (shown as being optionally oriented generally orthogonally relative to each other). Though the embodiment of FIG. 9 is shown without the nose portions that bear against the top such as the previously described nose portion 46 and 70, such nose portion features may be employed, particularly if cross supports are omitted. Further, the embodiment of FIG. 9 is shown as including an optional bowed top edge 174, which feature might be employed in any of the other embodiments. Further, as to this embodiment, the top edge need not be bowed, but may be straight.

Figure 10A:
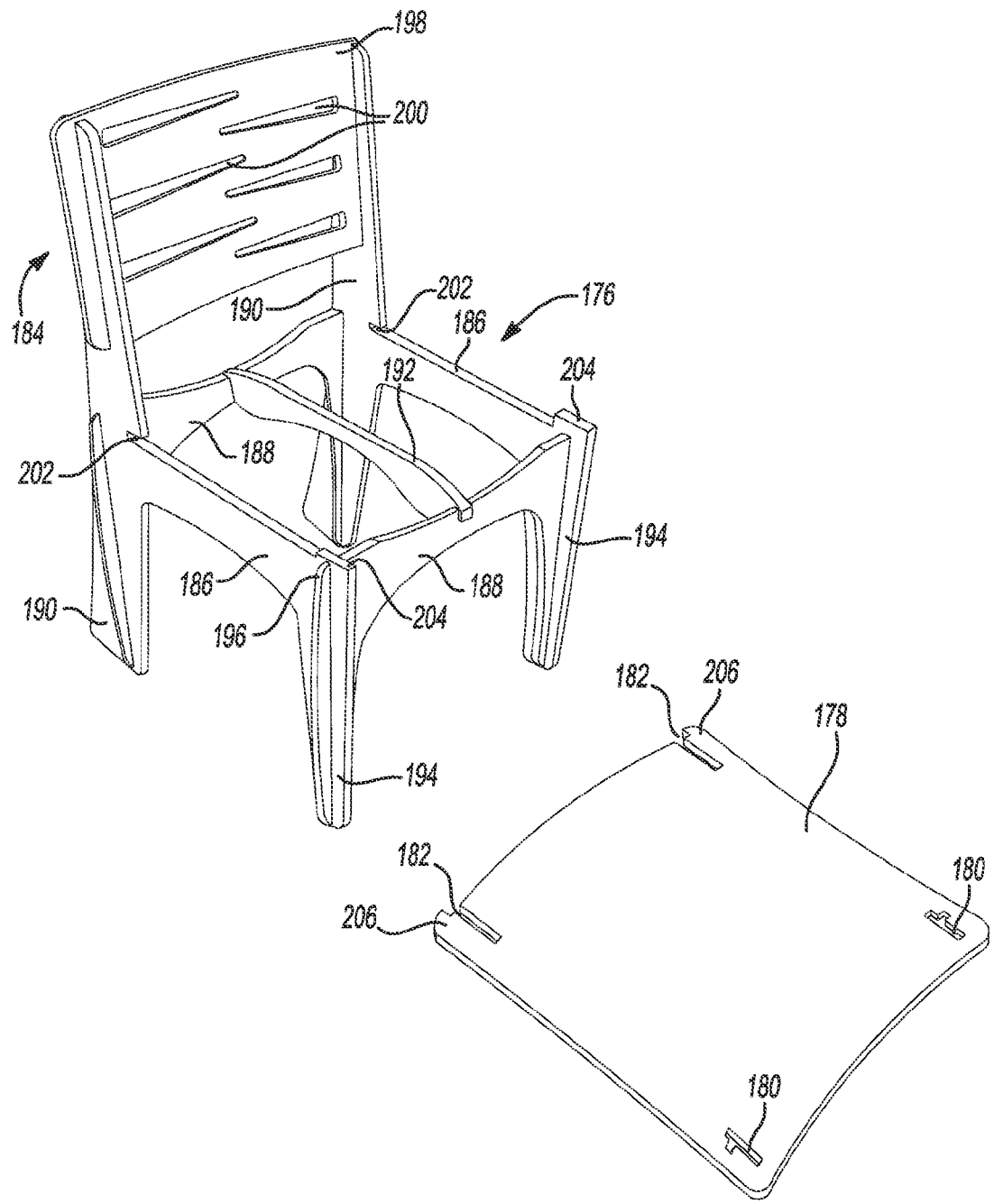
FIGS. 10A and 10B illustrate an example of a chair according to the present teachings.
Figure 10B:
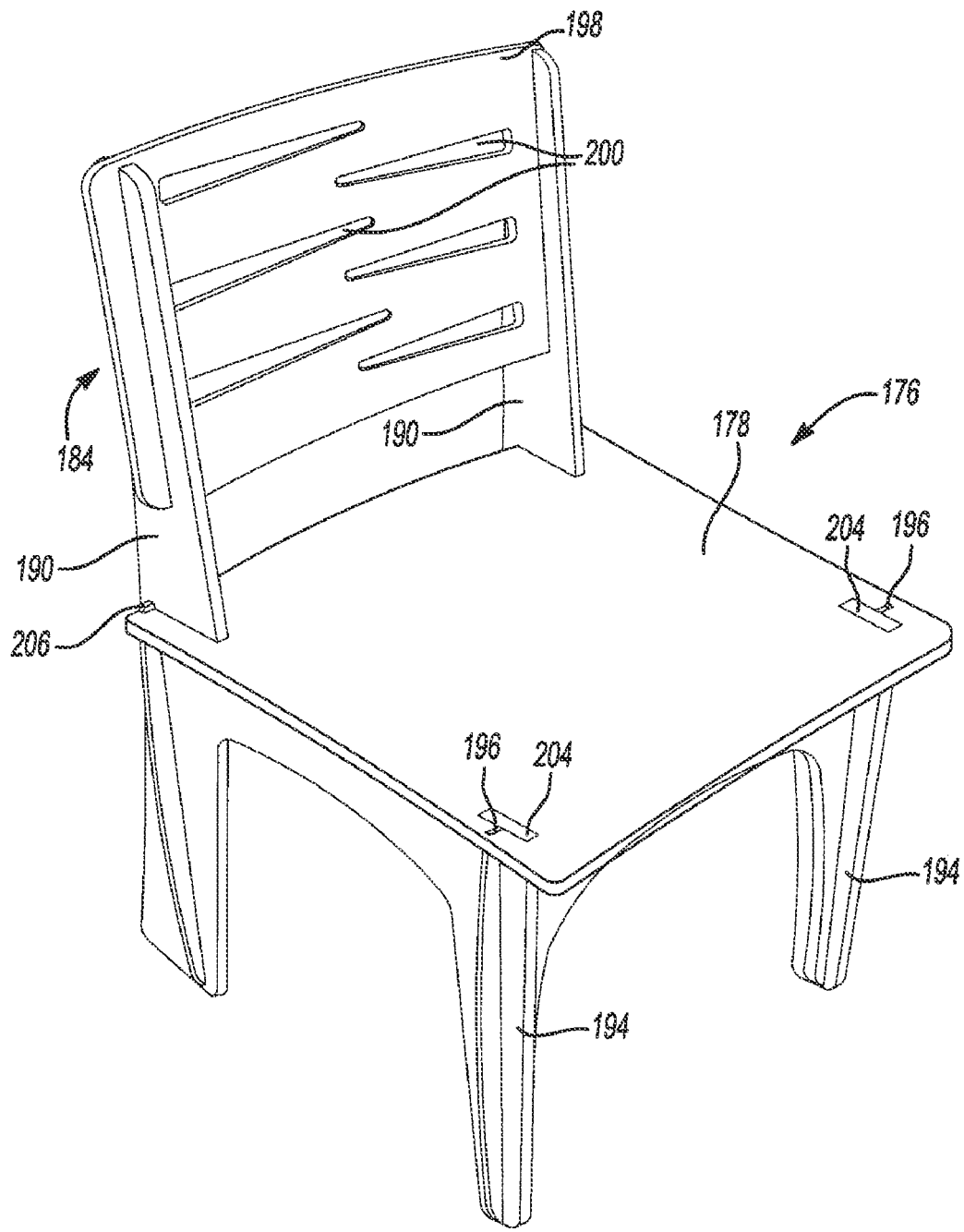

An article of furniture in accordance with the teachings of the invention may be a chair that includes a plurality of slotted individual parts (e.g., a total of only six or seven individual parts) that are inter-fitted and secured in a stable configuration. With reference to FIGS. 10A and 10B, there is illustrated an example of a chair 176. The chair includes a top 178 that is used as a seating surface (e.g., a substantially horizontally oriented seating surface). The top may have a seating surface that is generally flat, contoured or a combination of both. The top may include a wall structure that defines a plurality of openings used to frictionally engage supports of the chair, e.g., to frictionally engage rearward leg portions, to surround an upper part of forward leg portions (e.g., applying frictional forces, compressive forces or both). For example, as seen in FIGS. 10A and 10B, one or both of openings 180 and slots 182 may be defined in the top.

The chair may include a back portion that includes a back support member connected with at least one support, e.g., a back support member that is connected by opposing side supports. A back portion 184 thus may be defined to include a pair of opposing slotted side supports 186. The opposing slotted side supports 186 may be connected via opposing end supports 188 (e.g., a forward and rearward end support). Slotted side supports 186 preferably will be longer than at least the forward end support 188 (and preferably longer than the rearward end support also), and will thus include an upwardly projecting slotted end wall 190.

The top may rest on top of one or more cross supports similar in nature to the cross supports 42(42') previously described. For example, a suitable cross support 192 can connect either or both of the opposing slotted side supports 186 or opposing end supports 188. For example, the cross support 192 may be oriented axially in a longitudinally forward/rearward direction as shown, be positioned between opposing leg portions 194 of the side support structure 186, or both. Similar to the nose portions described elsewhere herein, the forward end support 188 may include a nose portion 196 that may extend upward (e.g., slightly higher than an upper edge of a spanning portion of the end support), so that when the top is assembled onto the assembled support structure, the nose can be press fit into a lateral projection in the opening 180. When assembled, the height of the top of the nose portion may be substantially the same as the upper surface of the top 178, so that it does not extend above the upper surface (e.g., the top of the nose portion is substantially coplanar with the adjoining region of the upper surface of the top).

The back portion may include a slotted back support member 198, which optionally may include openings 200. The back support member may be inter-fitted (e.g., preferably to achieve a frictional engagement) with the side supports 186 via inter-fitting the slots in each, consistent with the teachings herein for inter-fitting (see, generally FIGS. 1A-1D and associated discussion). One approach herein also contemplates inter-fitting the side supports 186 with the front and rear end supports 188 by their respective slots, preferably with the cross support also inter-fitted.

Side supports 186 may include one or more slots, such as undercut slots 202 (e.g., which may be greater than about 1 cm in length or even greater than about 2 cm length) that receive the top 178. Side supports 186 may include one or more projections, such as projections 204 that penetrate the opening 180 of the top. Further, the top may include one or more nose portions 206 that have an inwardly facing wall that bears against the rear end support 188 (e.g., along a side edge of an upper portion of the rear end support 188). It is seen that upon assembly a suitable stress state is created for stabilizing the chair and/or imparting strength thereto, that may include forces derived from the frictional engagement, forces derived from any deflection of the nose portion 206 by the support 188, frictional engagement forces from the fit of the projections 204 and the upper nose portion 196 of the forward end support, any tension or compression from the cross support 192, or any combination thereof. It is possible that additional stability might be imparted to the chair by the employment of a structure such as ring 122 discussed previously along any of the leg portions. Further any of the embodiments herein might employ the opening configuration like opening 180 of this embodiment as part of a top for helping to secure leg portions together.

The invention may also encompass business methods for the offer for sale, sale, manufacture and/or transport of articles of furniture. Due to its simplicity of manufacture, transport, or assembly, the articles of furniture herein lend themselves well to mass customization. The manufacturer may maintain a large inventory of stock materials without regard to individual design needs of customers, and can readily customize articles of furniture from the inventory per customer order. That is, the stock materials can be of relatively constant size, shape and/or thickness, which can in turn be varied to create different sized objects within the limits of the sheet of stock material itself. Due to the flexibility of the product in its production, it can be cut in multiple ways. As consumers order an article of furniture they may be presented with a variety of choices in stock materials, designs, geometries, and/or dimensions. This can be done by supplying a paper catalog, by providing an electronic catalog, at a retail center, over the internet, or any combination.

Certain materials can be employed that also lend themselves well to customization. For example, as discussed, one preferred material is a faced material, such as a composite material that includes aluminum (e.g., sheets) and a polyethylene core and is available under the DIBOND™. Preferably, the face of the material (e.g., an aluminum sheet for DIBOND™ types of materials) accepts printed designs thereon, it accepts a painted coating, a polyester clear-coat, or both. The materials also lend themselves well to customization steps that may be employed such as etching and/or cutting out of designs from the material.

The top or any of the individual parts may include a hologram design, a printed image (e.g., an ink-jet printed image) on an outer-facing surface, an ink-jet printed image on an outer-facing surface, a polymeric coating layer on an outer-facing surface (e.g., a polyurethane-containing, acrylic-containing or methacrylic-containing coating layer), or any combination.

Customers can be provided with choices of designs to select for applying to articles of furniture. Examples of designs may include logos or names (e.g., logos or names of colleges or other schools, logos or names of professional sports teams, logos or names of organizations, or the like), game boards, photographs, patterns to match other decorative patterns (e.g., carpet, bedding, upholstery, tapestry, dishes, etc.) or just abstract designs chosen by the customer. This can employ art-disclosed techniques akin to methods used for customization of t-shirts, such as is found at one or more of SPREADSHIRT.COM, CAFEPRESS.COM, THREADLESS.COM. This also offers customers the opportunity to design or buy multiple top pieces and inter-change them as needed for example if the are having a party or their kids want to play a board game they just switch out tops. Thus, the methods herein contemplate offering customers kits that include a plurality of tops of different designs.

Another aspect of the invention is a business method that includes employing a website where the user enters the site can choose a standard off the shelf model or click on customize one, similar to the t-shirt sites mentioned above. If they choose to customize one they are then offered a screen with sliders and a 3D view of the table that helps them adjust the size i.e. the height, width and length based on the limits of the material. After they have configured the size they can choose a color. From there they can choose to either, upload a custom graphic, adjust a preset graphic, i.e. change the color scheme, pick a graphic from our library or have no graphic on it at all. Finally, the order is confirmed processed packaged and shipped out the next day, ideally.

The present invention thus contemplates an approach for creating a customized article of furniture (e.g., a table or a chair), comprising the steps of selecting each of the leg supports, cross support, and tabletop components for the article using a graphical user interface associated with an internet website or some other computer network; storing the selection; and retrieving information about the selection at a future time; and optionally: i) selecting fewer than all of the initially selected components for replacing select (but not all) of the components; ii) using deign information associated with the initial selection to make selections for another table that may be different in some respect from the table created from the initial selection; or both (i) and (ii).

Figure 11:
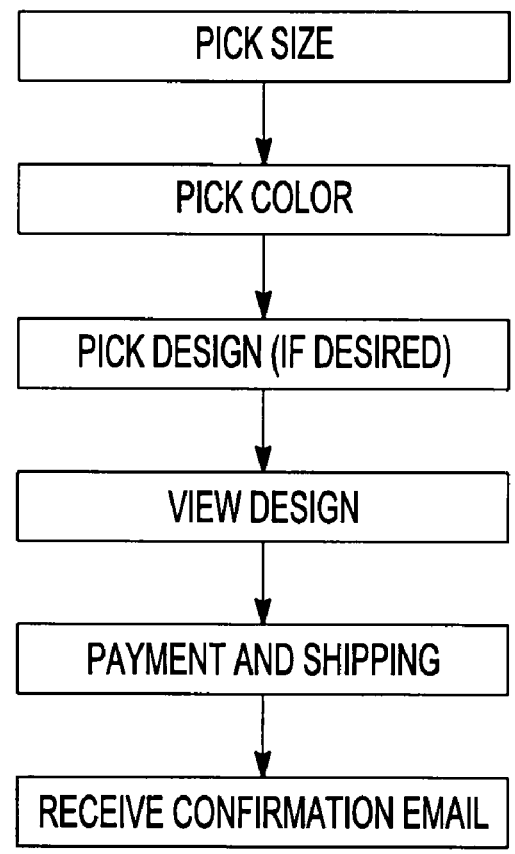
FIG. 11 is a flow chart for a possible business method according to the present teachings.

As shown in the flow diagram of FIG. 11, the present invention may be purchased through a website or through a retail store. The customer selects the type of furniture (e.g., coffee table, end table, desk, dining table, the like, or otherwise), size, height, width, length, or combinations thereof. Optionally, a type of material may be chosen or a suggested by the website of retail store. Next, a color, design, or both may be selected. The design may be uploaded from the customer or may be provided from a standard set of designs. The selection are shown in a final review of the design, which may be a panoramic image that may be rotatable (e.g., a GL application or other application that has the ability) to show a 360 degree view of the article of furniture. The customer may approve the selected customization or revise the selections. Once approved by the customer, the customer may enter a method of payment (e.g., credit card, Paypal®, check, the like, or otherwise) and selects shipping options (e.g., a mode of courier services, such as UPS, FedEx, USPS, the like or otherwise). Once the payment and shipping options are finalized, the customer may receive an email confirmation of the order. See also, FIG. 8 from Provisional application Ser. No. 60/971,651 filed Sep. 12, 2007, and U.S. Provisional application Ser. No. 61/034,290, filed Mar. 6, 2008, incorporated by reference herein.

It is also possible to have retail point of sale manufacture of the articles of furniture herein, wherein the customer selects the article of furniture and at a retail store, the furniture may be scored, cut, or both at the store, using blank sheets of material having designs and/or colors already integrated or the customer may select a prepackaged article having a standard design, size, shape, or combinations thereof. The customer can then carry away the furniture from the retail store. In this manner, the selection by the customer, the fabrication of the parts of the article of furniture or both may be performed at a retail point of sale, and possibly even as part of a same-day transaction.

It is possible that methods herein may include a step of offering articles of furniture for sale by a vendor of photographic reproductive services. For example, a vendor may offer an article with a top that includes a photographic image. The offering may be made by a vendor of photographic reproductive services and may be offered with two or more other customizable products that are selected from coffee mugs, cards, posters, awards, photobooks, t-shirts, coasters, calendars, plaques, or any combination thereof.

The invention may be further characterized by one or any combination of the following features. Articles of furniture in accordance with the present teachings may be made to consist of fewer than 8 individual parts; and more preferably fewer than 7 individual parts. For example, one preferred article of furniture consists of only 6 individual parts. The individual parts of the articles of furniture in accordance with the present teachings may all originate from one or more sheets of stock material. For example, all of the individual parts may originate from a single sheet of stock material. It is possible that all of the parts except for the top member may originate from a single sheet of stock material.

Among the advantages of the present invention are that a relatively stable article of furniture results from the use of relatively few separate parts, and optionally in the absence of any mechanical fasteners, or other devices for coupling components. By way of illustration, for an article of furniture that employs a tensioning member as described herein, the article will be essentially free of wobble (e.g., it will be free of an angular shift of any leg greater than about 10°, and more preferred it will be free of an angular shift of any leg greater than about 5° from its initial unloaded position), in the direction perpendicular to the longitudinal axis of the tensioning member, in the direction transverse to the longitudinal axis of the tensioning member, or both.

The top member may be recessed relative to the tallest portion of the leg members. Individual parts or panel members that are employed to define the legs, the top, and the cross beam support may be free of any hinge, free of any crease, free of any mechanical fastener (e.g., screws, nails, pins, rods, dowels, clips, latches, or the like), free of any adhesive, or any combination thereof. The articles of furniture of the present invention in their final assembled state may also be free of any hinge, free of any crease, free of any mechanical fastener (e.g., screws, nails, pins, rods, dowels, clips, latches, or the like), free of any adhesive, or any combination thereof. The tables of the present invention in their final assembled state may be free of any connected bench or seating surface. The articles of furniture of the present invention may be free of any slotted legs that are located in a central region of the articles (e.g., slotted legs may be present only in the side or end portions of the articles). Support for the top of the articles of furniture herein may be derived solely from the slotted legs and any cross beam support. Any cross beam support may be suspended above the floor (or other horizontal support surface) and be free of any direct contact with the floor (or other horizontal support surface).

The interconnecting leg supports herein may connect to substantially define a peripheral edge portion that is within about 8 cm, more preferably within about 5 cm, and still more preferably within about 3 cm, from a peripheral edge of a top member of the article of furniture. The interconnecting leg supports herein may connect to substantially define the peripheral edge of the article of furniture.

Any slots or notches that are employed in the leg supports, the top and/or any cross support may be generally linear. Any slots or notches that are employed in the leg supports, the top member and/or any cross support may be oriented in substantially a single axial direction.

Any cross support that is used (e.g., cross support 42(42')) may be located toward the top of the article of furniture, proximate the ground (e.g., spaced apart from the top of the article of furniture by at least about 20 cm), or both. For example, it is possible that a cross support is used at an intermediate height approximately from about ⅓ to about ⅔ the height of the top.

Over at least 30% of its length (more preferably over at least 50% of its length), the width of any interconnecting slots in any members or panels may be approximately the thickness of the member or panel, e.g., within about 20%, and more preferably within about 10%, so that frictional engagement between the interlocking components is possible.

Examples of approximate dimensions are as set forth in Table 1. Though not set forth explicitly in the Table itself, the relative proportionate ratios of the dimensions set forth in the Table 1 are also contemplated as within the invention.

TABLE 1

|  | Preferred | More preferred | Most preferred |
| --- | --- | --- | --- |
| Leg slot length (SL) | 5 to 35 cm | 10 to 30 cm | 15 to 25 cm |
| Leg slot width (SW) | 1 to 20 mm | 2 to 15 mm | 3 to 10 mm |
| Span of leg support (SS) | 25 to 80 cm | 30 to 60 cm | 35 to 50 cm |
| Span of cross support (CS) (in tension) | (0.65 to 0.98) × SS | (0.70 to 0.95) × SS | (0.75 to 0.90) × SS |
| Span of cross support (in compression) | SS/ (0.65 to 0.98) | SS/ (0.70-0.95) | SS/ (0.75 to 0.90) |
| Leg support height ($h_L$) | 15 to about 80 cm | 20 to about 60 mm | 30 to about 50 mm |
| Top length (l) | 0.2 to 1.5 m | 0.4 to 1.2 m | 0.5 to 1 m |
| Top width (w) | 0.2 to 1.5 m | 0.4 to 1.2 m | 0.5 to 1 m |
| Edge lip height (EL) | 1 to 40 mm | 5 to 30 mm | 10 to 20 mm |
| Top panel notch depth | 2 to 20 mm | 3 to 15 mm | 4 to 10 mm |
| Panel thickness | 1 to 20 mm | 2 to 15 mm | 3 to 12 mm |

The ratio of leg slot length (SL) to overall leg support height $h_L$ or both may be less than about 1:4, more preferably less than about 1:3, still more preferably less than about 1:2. The ratio of leg slot length to overall leg length of greater than about 1:1.2, more preferably greater than about 1:1.5, still more greater than about 1:1.8.

The ratio of leg slot width (SW) to leg slot length (SL) may be less than about 1:50, more preferably less than about 1:80 and still more preferably less than about 1:100. The ratio of leg slot width to leg slot length may be more than about 1:500, more preferably more than about 1:300 and still more preferably more than about 1:150.

Figure 1D:
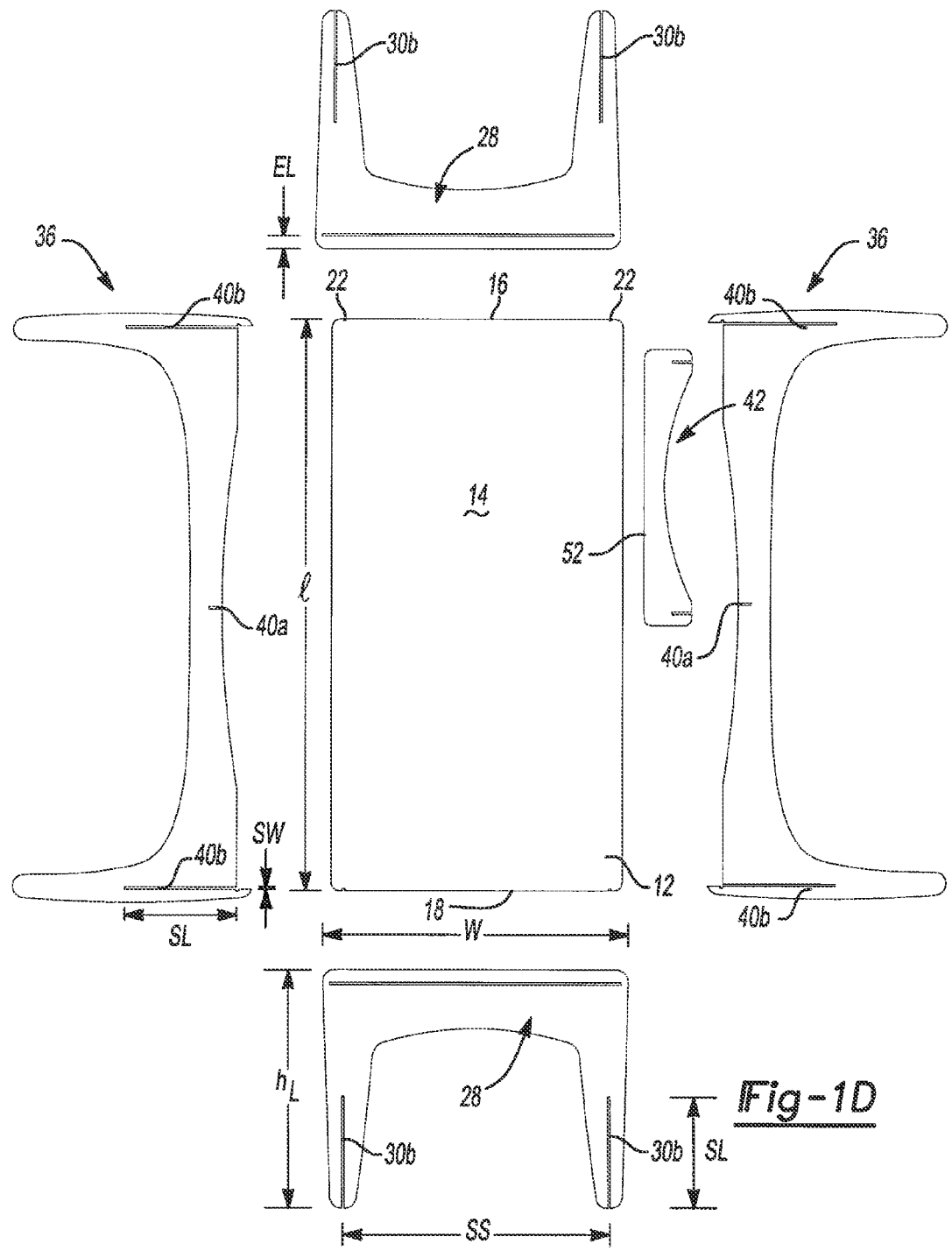
FIG. 1D is a plan view of the components of the table of FIGS. 1A-1C.
Figure 1E:
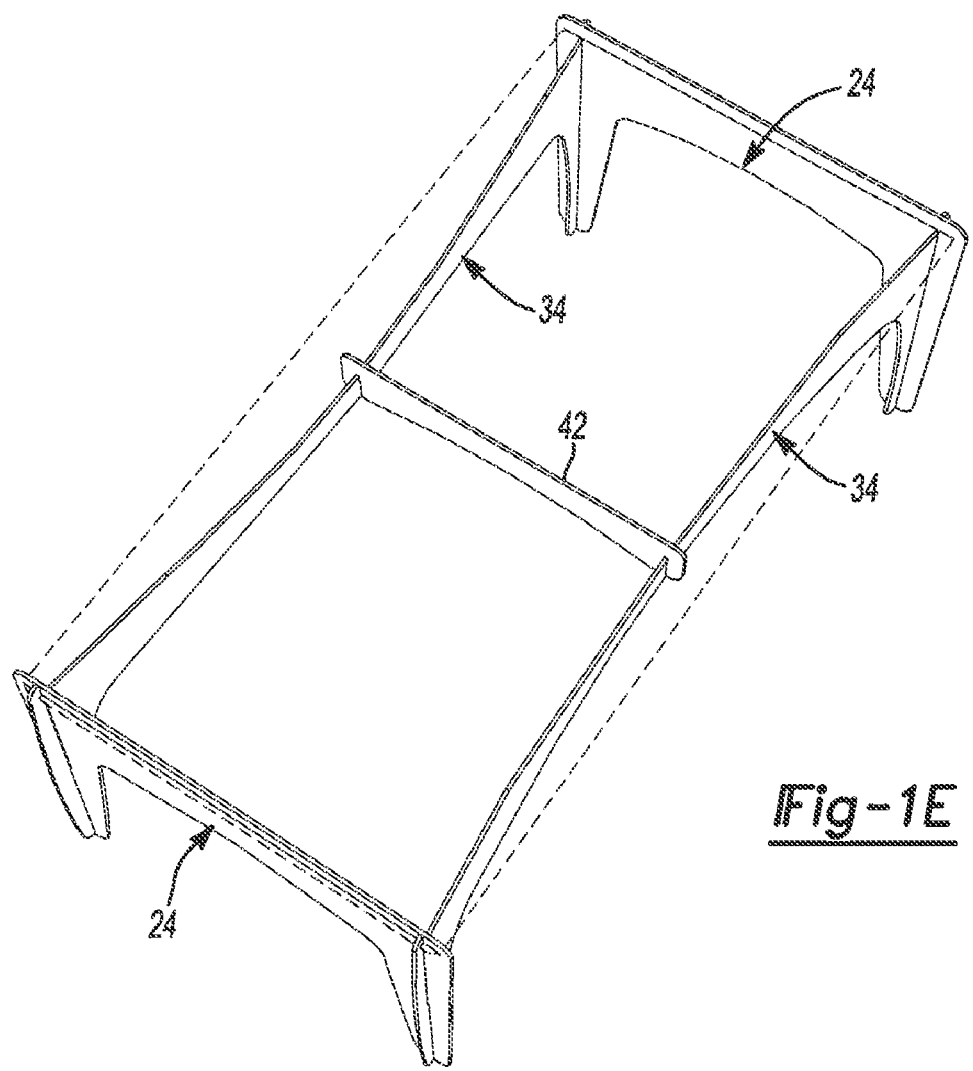
FIG. 1E is a perspective view of the table of FIG. 1A with the top in phantom, to illustrate how a cross-support structure applies tension for drawing long side support structures inward.
Figure 1F:
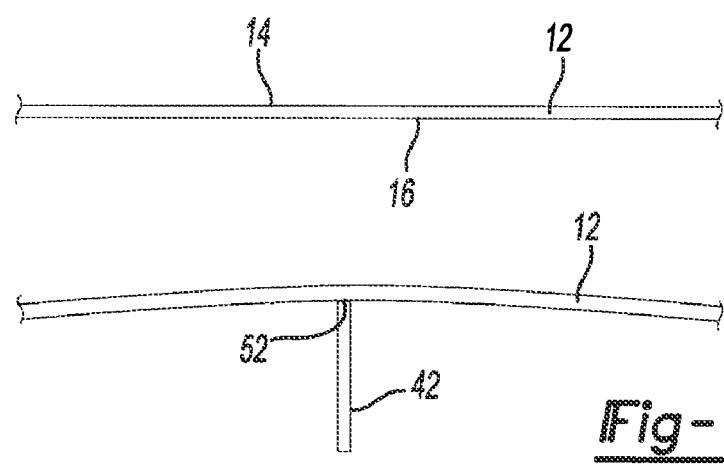
FIG. 1F illustrates how a cross-support structure may be employed to apply a force to a top.
Figure 1G:
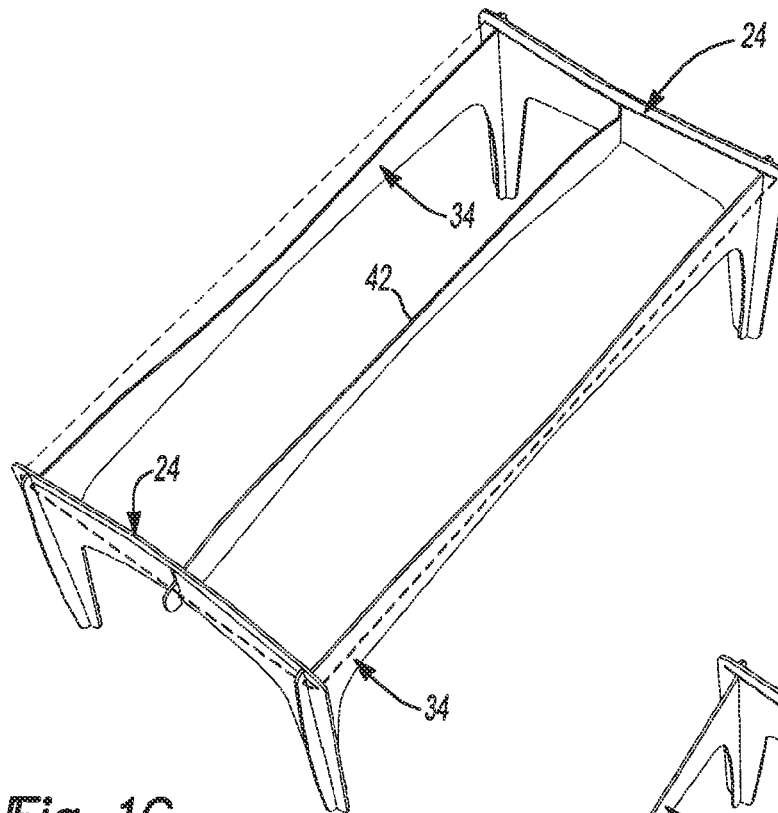
FIG. 1G is a perspective view of an alternative variation to the table of FIG. 1A with the top in phantom, to illustrate how a cross-support structure applies tension for drawing short side support structures inward.
Figure 1H:
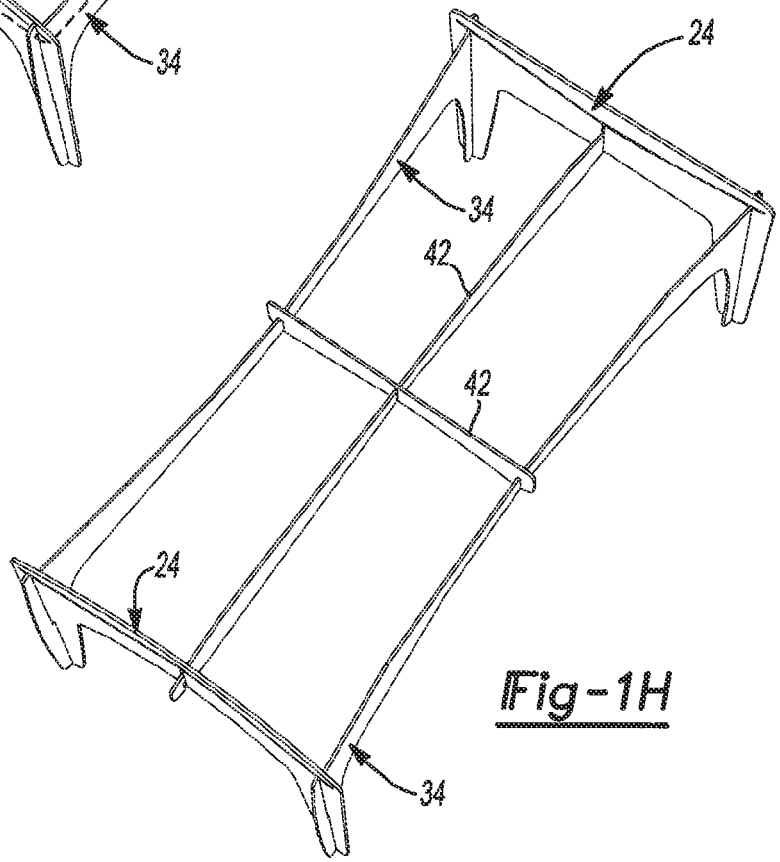
FIG. 1H is a perspective view of another variation to the table of FIGS. 1A and 1G with the top removed to illustrate how a cross-support structure applies tension for drawing short side support structures inward and long side support structures inward.
Figure 1K:
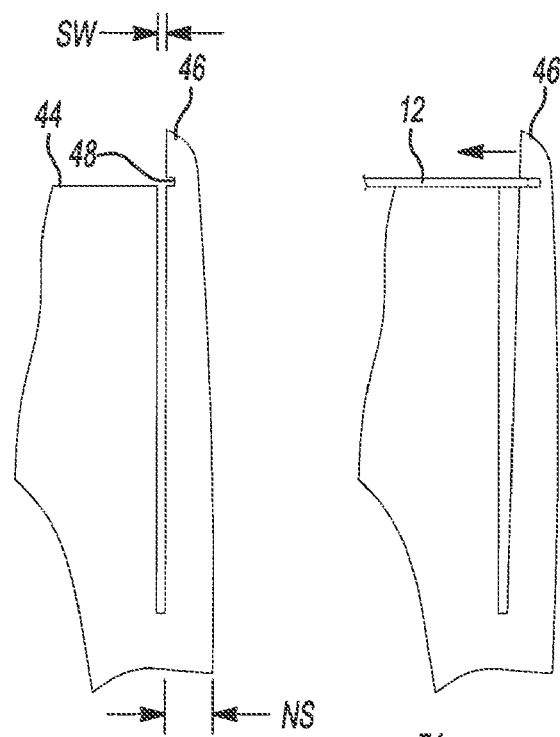
FIG. 1K illustrates how structures may include a nose portion for creating a force state when loaded with a top.

When the cross support is employed it has a span CS between its slots (or between side walls 128 of FIG. 6B) that is different from the span of slots in the leg supports that are oriented generally parallel to the cross support (e.g., the span SS of FIG. 1D). For example, the CS may be within at least about 5% of the SS, more preferably at least about 10%, and still more preferably at least about 15%. The CS may differ from the SS by less than about 35%, more preferably by less than about 30%, and still more preferably by less than about 25%.

The depth of top notch 22 (from edge 18) may be less than about 3 cm, more preferably less than about 2 cm, and still more preferably less than about 1 cm. The depth of the top notch 22 (from edge 18) may be more than about 0.1 cm, more preferably more than about 0.2 cm, and still more preferably more than about 0.3 cm. For example, it may be about 0.5 cm.

The depth of notch 48 may be less than about 3 cm, more preferably less than about 2 cm, and still more preferably less than about 1 cm. The depth of notch 48 may be more than about 0.1 cm, more preferably more than about 0.2 cm, and still more preferably more than about 0.3 cm. For example, it may be about 0.5 cm.

For typical embodiments, it is contemplated that at least two edges will have a height (referred to as the edge lip height (EL as shown in FIG. 1D)) that projects higher than the upper surface of the top panel. The edge lip height may be greater than about 1 mm, more preferably greater than about 5 mm, and still more preferably greater than about 10 mm. The edge lip height may be smaller than about 40 mm, more preferably smaller than about 30 mm and still more preferably smaller than about 20 mm. It may be possible that the edge lip includes one or more cutouts or other openings, such as an opening for providing a grip or handle so that the article of furniture can be lifted or lowered.

FIGS. 6A-6F of U.S. Provisional Application Ser. No. 60/971,651 filed Sep. 12, 2007, and/or U.S. Provisional application Ser. No. 61/034,290, filed Mar. 6, 2008, also show several of the herein-discussed embodiments of the present invention, which are exemplary and are not limiting. The present invention is customizable with embodiments having different sizes and heights. Furthermore, the present invention may include custom designs that could either be printed on table material, etched on table material, or cut out of the table material.

Additional aspects of the invention can be gleaned from the teachings herein, including those of FIGS. 10 through 20 of Provisional application Ser. No. 61/034,290, filed Mar. 6, 2008, incorporated by reference herein, which show various alternative embodiments. The features shown in the respective embodiments are not limited solely to those embodiments. Rather, they may be employed in combination with any of the other embodiments Though identified as side supports, one or more of the supports may also be regarded as a cross support, such as is illustrated in FIG. 10 of Provisional application Ser. No. 61/034,290, filed Mar. 6, 2008, incorporated by reference herein. It will also be appreciated that the location of slots or other openings may be varied. For example, slots shown at the bottom of a leg may be re-located to a top of a leg, with a corresponding slot in a co-acting leg similarly reversed.

Thus, for any of the embodiments herein, it will be seen that cross supports or what have been referred to as tensioning members of Provisional application Ser. No. 60/971,651 filed Sep. 12, 2007 or Provisional application Ser. No. 61/034,290, filed Mar. 6, 2008, incorporated by reference herein, may generally be employed as retaining means; the tensioning member may function to bow the table top (e.g., in an unloaded condition) for preventing it from sagging under load (e.g., "Tension action 2" of FIG. 10 or Provisional application Ser. No. 61/034,290, filed Mar. 6, 2008, incorporated by reference herein); the tensioning member may pull opposing support members toward each other for assisting to provide lateral stability (e.g., "Tension action 1" of FIG. 10 of Provisional application Ser. No. 61/034,290, filed Mar. 6, 2008, incorporated by reference herein); the tensioning member may push opposing support members away from each other (e.g., FIGS. 18 and 19 of Provisional application Ser. No. 61/034,290, filed Mar. 6, 2008, incorporated by reference herein); one or more tension rings may be employed, such as around legs as shown in FIG. 12 of Provisional application Ser. No. 61/034,290, filed Mar. 6, 2008, incorporated by reference herein; plural tension members may be used (as shown in FIG. 14 of Provisional application Ser. No. 61/034, 290, filed Mar. 6, 2008, incorporated by reference herein); tensioning members may be employed for tensioning more than two sides of the table (e.g., all sides of the table may be connected by tensioning members, such as depicted in FIG. 15 of Provisional application Ser. No. 61/034,290, filed Mar. 6, 2008, incorporated by reference herein); tensioning members may have slots or notches along side edges or bottom edges (e.g., as in FIGS. 19 and 20 of Provisional application Ser. No. 61/034,290, filed Mar. 6, 2008, incorporated by reference herein), or even top edges, or any combinations thereof. It will be appreciated that retaining means may be configured for applying a negative tension or compression of components.

For any of the embodiments herein, more than one horizontal surface or tabletop may be employed (e.g., FIGS. 16 and 17 of Provisional application Ser. No. 61/034,290, filed Mar. 6, 2008, incorporated by reference herein); the sides and the cross supports may be substantially the same structure or otherwise allow the table to be flipped over and its bottom tabletop being used as an upper tabletop (e.g., as shown in FIG. 16 of Provisional application Ser. No. 61/034,290, filed Mar. 6, 2008, incorporated by reference herein); the tabletop corners may be notched for snap-fit securing (e.g., FIGS. 16 and 17 of Provisional application Ser. No. 61/034,290, filed Mar. 6, 2008, incorporated by reference herein); or any combination thereof.

Though described generally herein as employing interfitting of components via slots for achieving a friction fit, one or more other modes of mechanical inter-connection engagement may be used in addition or in place of interference fits. Magnetic attachments may also be employed for joining parts. Friction fits contemplated herein may include be shrink fits, press fits or other interference fits.

Though certain embodiments herein are disclosed as tables, they are not limited to tables but may be seating surfaces as well (e.g., they may be benches). Accordingly, teachings herein regarding tables also contemplate benches or seating surfaces as well.

Further examples of additional embodiments of the present invention are shown in the following claims, herein incorporated by reference for all purposes. References to tables are not intended as limiting. The teachings herein may apply to other articles of furniture as well.

It will be further appreciated that functions or structures of a plurality of components or steps may be combined into a single component or step, or the functions or structures of one-step or component may be split among plural steps or components. The present invention contemplates all of these combinations. Unless stated otherwise, dimensions and geometries of the various structures depicted herein are not intended to be restrictive of the invention, and other dimensions or geometries are possible. Plural structural components or steps can be provided by a single integrated structure or step. Alternatively, a single integrated structure or step might be divided into separate plural components or steps. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention. The present invention also encompasses intermediate and end products resulting from the practice of the methods herein. The use of "comprising" or "including" also contemplates embodiments that "consist essentially of" or "consist of" the recited feature.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the invention. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Without limitation, the present invention specifically incorporates by reference each of the drawings and the attendant verbal explanatory text therein that was present in the provisional application Ser. No. 60/971,651 filed Sep. 12, 2007, or Provisional application Ser. No. 61/034,290, filed Mar. 6, 2008, both incorporated by reference herein. References to drawings in such provisional applications also include references to any such attendant verbal explanatory text. The present invention specifically incorporates by reference the teachings of each of the claims present in the provisional application Ser. No. 60/971,651 filed Sep. 12, 2007, or Provisional application Ser. No. 61/034,290, filed Mar. 6, 2008, both incorporated by reference herein.

The invention claimed is:

1. An article of furniture comprising:
   a pair of opposing leg support structures;
   a pair of opposing tops, at least one of which includes one or more openings therethrough or one or more slots arranged along an edge thereof; and
   at least one cross support connecting the pair of opposing leg support structures together;
   the pair of opposing leg support structures being inter-fitted with the pair of opposing tops via an interference fit with the one or more openings or the one or more slots to define a support assembly;
   the pair of opposing tops being supported by and attached to the pair of opposing leg support structures without the need for a mechanical fastener or adhesive; and
   wherein the cross support creates a force state that attaches at least one of the pair of opposing tops to the support assembly without the need for a mechanical fastener or adhesive, and thereby stabilizes the article of furniture, wherein the force state includes one or more forces applied to the pair of opposing leg support structures, in addition to any frictional force from the interference fit.

2. The article of furniture of claim 1, wherein each of the pair of opposing leg support structures includes a pair of opposing and spaced apart leg supports.

3. The article of furniture of claim 2, wherein the at least one cross support connects the opposing leg support structures with each other in a tensile state or a compressive state of sufficient magnitude that the opposing leg support structures are elastically deflected.

4. The article of furniture of claim 2, wherein the at least one cross support has an upper edge that bears against a bottom surface of at least one of the opposing tops to bow the upper surface of the respective top convexly outward;
 wherein the at least one cross support includes ends having one or more tongues and the tongues laterally project from the ends.

5. The article of furniture of claim 1, wherein the at least one cross support has an upper edge that bears against a bottom surface of at least one of the opposing tops to bow the upper surface of the respective top convexly outward.

6. The article of furniture of claim 5, wherein the largest thickness of any of its parts is less than about 10 mm and
 wherein the at least one cross support includes ends having one or more tongues.

7. The article of furniture of claim 1, wherein the article of furniture consists of an assembly of 7 individual parts or fewer.

8. The article of furniture of claim 1, wherein the largest thickness of any of its parts is less than about 10 mm.

9. The article of furniture of claim 1, wherein parts of the article of furniture are made from a faced composite material that includes a densified thermoplastic polymeric core sandwiched between layers of metal, and the faced composite material has a thickness of less than about 10 mm.

10. The article of furniture of claim 9, wherein the pair of opposing tops and the pair of opposing leg support structures are formed from a common sheet of stock material.

11. The article of furniture of claim 1, wherein the article is selected from a table or a chair.

12. The article of furniture of claim 1, wherein the article of furniture has rotational symmetry.

13. The article of furniture of claim 1, wherein the at least one cross support includes ends having one or more tongues.

14. The article of furniture of claim 13, wherein the tongues laterally project from the ends.

15. The article of furniture of claim 1, wherein one of the opposing tops or any of the individual parts may include a hologram design or a printed image on an outer facing surface.

16. The article of furniture of claim 15, wherein the printed image is an inkjet printed image.

17. The article of furniture of claim 15, wherein the outer facing surface includes a painted coating, a polyester clearcoat, or both.

18. The article of furniture of claim 1, wherein a plurality of the articles of furniture are stacked together.

19. The article of furniture of claim 1, wherein the at least one cross support includes a lateral sidewall.

* * * * *